US011715305B1

(12) United States Patent
Mandava

(10) Patent No.: US 11,715,305 B1
(45) Date of Patent: Aug. 1, 2023

(54) TRAFFIC DETECTION SYSTEM USING MACHINE VISION

(71) Applicant: Amitha Nandini Mandava, Richardson, TX (US)

(72) Inventor: Amitha Nandini Mandava, Richardson, TX (US)

(*) Notice: Subject to any disclaimer, the term of this patent is extended or adjusted under 35 U.S.C. 154(b) by 0 days.

(21) Appl. No.: 18/072,541

(22) Filed: Nov. 30, 2022

(51) Int. Cl.
G06K 9/00 (2022.01)
G06V 20/54 (2022.01)
G06V 20/40 (2022.01)
G06V 10/22 (2022.01)
G06V 10/26 (2022.01)

(52) U.S. Cl.
CPC .............. G06V 20/54 (2022.01); G06V 10/22 (2022.01); G06V 10/267 (2022.01); G06V 20/41 (2022.01); G06V 20/48 (2022.01); G06V 2201/08 (2022.01)

(58) Field of Classification Search
None
See application file for complete search history.

(56) References Cited

U.S. PATENT DOCUMENTS

| 4,847,772 | A | * | 7/1989 | Michalopoulos | G08G 1/00 382/104 |
| 5,283,573 | A | | 2/1994 | Takatou et al. | |
| 5,365,115 | A | | 11/1994 | Kaylon et al. | |
| 5,809,161 | A | * | 9/1998 | Auty | G08G 1/054 382/104 |
| 5,847,755 | A | * | 12/1998 | Wixson | G06V 20/54 348/149 |
| 5,999,635 | A | * | 12/1999 | Higashikubo | G08G 1/04 382/104 |
| 6,075,874 | A | * | 6/2000 | Higashikubo | G06V 20/54 382/104 |
| 6,434,254 | B1 | * | 8/2002 | Wixson | G08G 1/04 348/169 |
| 6,760,061 | B1 | | 7/2004 | Glier et al. | |
| 6,842,719 | B1 | | 1/2005 | Fitzpatrick et al. | |

(Continued)

OTHER PUBLICATIONS

Iwasaki et al., "Real-time robust vehicle detection through the same algorithm both day and night," 2007 International Conference on Wavelet Analysis and Pattern Recognition, Beijing, China, 2007, pp. 1008-1014, doi: 10.1109/ICWAPR.2007.4421579. (Year: 2007).*

(Continued)

Primary Examiner — Feng Niu

(57) ABSTRACT

A method of detecting traffic passing a camera overlooking a roadway. The method comprises receiving video frames by a traffic analytics engine from the camera, determining a mask that defines a lane detection region by the traffic analytics engine based on an assumed average length of a vehicle and based on analyzing lane boundary markers in the video frames; determining a background reference frame by the traffic analytics engine by applying the mask to the video frames and by averaging the pixels of the masked video frames; determining that at least some of the masked video frames differ from the background reference frame by more than a detection threshold; and incrementing a traffic count associated with the lane detection region stored in a memory of the computer system based on the masked video frames that differ from the background reference frame by more than the detection threshold.

16 Claims, 9 Drawing Sheets

(56) References Cited

U.S. PATENT DOCUMENTS

| | | | |
|---|---|---|---|
| 7,460,691 B2* | 12/2008 | Ng | H04N 7/18 |
| | | | 73/488 |
| 7,577,274 B2 | 8/2009 | Brodsky | |
| 7,580,548 B2* | 8/2009 | Saka | H04N 17/002 |
| | | | 382/104 |
| 8,019,157 B2 | 9/2011 | Chen et al. | |
| 8,090,152 B2* | 1/2012 | Kageyama | G06V 20/588 |
| | | | 382/104 |
| 8,233,721 B2* | 7/2012 | Wagg | G06T 7/75 |
| | | | 382/209 |
| 8,477,995 B2* | 7/2013 | Porter | H04N 13/122 |
| | | | 382/103 |
| 8,878,936 B2 | 11/2014 | Nerayoff et al. | |
| 9,225,943 B2* | 12/2015 | Li | H04N 7/18 |
| 9,412,268 B2 | 8/2016 | Saptharishi et al. | |
| 9,418,546 B1 | 8/2016 | Whiting et al. | |
| 9,424,747 B2 | 8/2016 | Bernal et al. | |
| 9,483,838 B2* | 11/2016 | Bulan | G06V 20/54 |
| 9,946,950 B2* | 4/2018 | Mae | G06T 7/80 |
| 9,990,549 B2* | 6/2018 | Kataoka | G06T 7/13 |
| 10,108,863 B2 | 10/2018 | Miller et al. | |
| 10,176,384 B2* | 1/2019 | Bulan | G06V 20/54 |
| 10,529,080 B2 | 1/2020 | Idrisov | |
| 10,621,735 B2 | 4/2020 | Saleemi et al. | |
| 10,671,859 B2* | 6/2020 | Fujikawa | G06V 10/143 |
| 10,853,665 B2* | 12/2020 | Kang | G05D 1/0212 |
| 11,113,900 B2* | 9/2021 | Kaseda | G06V 10/751 |
| 2005/0058323 A1* | 3/2005 | Brodsky | G06V 10/255 |
| | | | 382/104 |
| 2006/0274917 A1* | 12/2006 | Ng | G06V 20/54 |
| | | | 382/103 |
| 2008/0107304 A1* | 5/2008 | Coulter | G06V 40/103 |
| | | | 382/103 |
| 2009/0141941 A1* | 6/2009 | Wagg | G06T 7/75 |
| | | | 382/103 |
| 2011/0170744 A1 | 7/2011 | Malinovskiy et al. | |
| 2011/0199372 A1* | 8/2011 | Porter | G06T 7/254 |
| | | | 382/106 |
| 2012/0162431 A1 | 6/2012 | Riesebosch | |
| 2013/0342692 A1* | 12/2013 | Li | G01N 21/538 |
| | | | 348/143 |
| 2014/0211986 A1 | 7/2014 | Dryer et al. | |
| 2015/0029042 A1 | 1/2015 | Ikeya et al. | |
| 2015/0310615 A1* | 10/2015 | Bulan | G06T 7/20 |
| | | | 348/143 |
| 2015/0363659 A1* | 12/2015 | Mae | G06T 3/00 |
| | | | 348/143 |
| 2016/0210519 A1* | 7/2016 | Kataoka | G06V 20/588 |
| 2017/0039432 A1* | 2/2017 | Bulan | G06T 7/20 |
| 2018/0005048 A1 | 1/2018 | Ding et al. | |
| 2018/0158329 A1 | 6/2018 | Benhammou et al. | |
| 2018/0197022 A1* | 7/2018 | Fujikawa | G08G 1/167 |
| 2018/0247138 A1* | 8/2018 | Kang | G06V 10/762 |
| 2020/0074754 A1* | 3/2020 | Kaseda | G06T 7/62 |

OTHER PUBLICATIONS

Yu et al., "A Novel Traffic Flow Detection Method Using Multiple Statistical Parameters," 2015 Seventh International Conference on Measuring Technology and Mechatronics Automation, Nanchang, China, 2015, pp. 51-54, doi: 10.1109/ICMTMA.2015.20. (Year: 2015).*

Zhou et al., "Real Time Robust Human Detection and Tracking System," 2005 IEEE Computer Society Conference on Computer Vision and Pattern Recognition (CVPR'05)—Workshops, San Diego, CA, USA, 2005, pp. 149-149, doi: 10.1109/CVPR.2005.517. (Year: 2005).*

A. Alsanabani, A., A. Ahmed, M., & M. Al Smadi, A. (2020). Vehicle counting using detecting-tracking combinations: A comparative analysis. 2020 The 4th International Conference on Video and Image Processing. https://doi.org/10.1145/3447450.3447458.

Alsanabani, A. A., Saeed, S. A., Al-Mkhlafi, M., & Albishari, M. (2021). A low cost and real time vehicle detection using enhanced yolov4-tiny. 2021 IEEE International Conference on Artificial Intelligence and Computer Applications (ICAICA). https://doi.org/10.1109/icaica52286.2021.9498188.

Azimjonov, J., & Özmen, A. (2022). Vision-based vehicle tracking on highway traffic using bounding-box features to extract statistical information. Computers & Electrical Engineering, 97, 107560. https://doi.org/10.1016/j.compeleceng.2021.107560.

Cucchiara, R., Grana, C., Piccardi, M., & Prati, A. (n.d.). Statistic and knowledge-based moving object detection in traffic scenes. ITSC2000. 2000 IEEE Intelligent Transportation Systems. Proceedings (Cat. No.00TH8493). https://doi.org/10.1109/itsc.2000.881013.

Fachri, M. Vehicle counter in traffic using pixel area method with multi-region of interest. (2022). Budapest International Research and Critics Institute-Journal (BIRCI-Journal) vol. 5, No. 1, pp. 3821-3829. e-ISSN: 2615-3076 (Online), p-ISSN: 2615-1715 (Print).

Gonzalez, R. C., & Woods, R. E. (2018). Digital image processing.

Hurtado-Gómez, J., Romo, J. D., Salazar-Cabrera, R., Pachón de la Cruz, Á., & Madrid Molina, J. M. (2021). Tiaffic signal control system based on intelligent transportation system and reinforcement learning. Electronics, 10(19), 2363. https://doi.org/10.3390/electronics10192363.

Meng, Q., Song, H., Zhang, Y., Zhang, X., Li, G., & Yang, Y. (2020). Video-based vehicle counting for expressway: A novel approach based on vehicle detection and correlation-matched tracking using image data from PTZ cameras. Mathematical Problems in Engineering, 2020, 1-16. https://doi.org/10.1155/2020/1969408.

O'Gorman, L., Sammon, M. J., & Seul, M. (2008). Practical algorithms for image analysis with CD-ROM. Cambridge University Press.

Piccardi, M. (n.d.). Background subtraction techniques: A review. 2004 IEEE International Conference on Systems, Man and Cybernetics (IEEE Cat. No.04CH37583). https://doi.org/10.1109/icsmc.2004.1400815.

Song, H., Liang, H., Li, H., Dai, Z., & Yun, X. (2019). Vision-based vehicle detection and counting system using deep learning in highway scenes. European Transport Research Review, 11(1). https://doi.org/10.1186/s12544-019-0390-4.

Tsai, C., & Yeh, Z. (2013). Intelligent moving objects detection via adaptive frame Differencing method. Intelligent Information and Database Systems, 1-11. https://doi.org/10.1007/978-3-642-36546-1_1.

Zhang, S., Wu, G., Costeira, J. P., & Moura, J. M. (2017). FCN-rlstm: Deep spatio-temporal neural networks for vehicle counting in city cameras. 2017 IEEE International Conference on Computer Vision (ICCV). https://doi.org/10.1109/iccv.2017.396.

* cited by examiner

TRAFFIC DETECTION SYSTEM USING MACHINE VISION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Counting of vehicles passing particular points of reference on roadways may be used by roadway management to determine traffic flows at different times of the day and days of the week. This information can be valuable in planning roadway lane expansion, traffic light control, road network upgrades, and public transit planning. There are a variety of automated systems deployed that perform traffic counting, but they all tend to suffer from one drawback or another. Poor counting accuracy and significant computational complexity is common in some systems. Some systems are not readily scaled to widespread deployments.

SUMMARY

In an embodiment, a traffic detection system is disclosed. The system comprises at least one processor; a memory; and a traffic analytics engine stored in the memory. When executed by the at least one processor the analytics engine receives a plurality of video frames captured by a camera overlooking a multi-lane roadway, for each lane of the multi-lane roadway, analyzes the plurality of video frames and determines a pixel intensity variance background threshold for the lane as a product of a median pixel intensity value for the lane with a background factor that is less than 1.0, and for each lane of the multi-lane roadway, analyzes the plurality of video frames and determines video frames having a pixel intensity variance for the lane that is less than the pixel intensity variance background threshold for the lane. The analytics engine further, for each lane of the multi-lane roadway, analyzes the video frames determined to have a pixel intensity variance for the lane that is less than the pixel intensity variance background threshold for the lane and determines a background reference frame for the lane, for each lane of the multi-lane roadway, analyzes the video frames and determines a difference image for each frame as the difference between a lane detection region corresponding to the lane within the frame and the background reference frame for the lane, and for each lane of the multi-lane roadway, determines a vehicle detection threshold for the lane based on the difference images of each frame for the lane. The analytics engine further, for each lane of the multi-lane roadway, identifies difference images for the lane that exceed the vehicle detection threshold for the lane and for each lane of the multi-lane roadway, increments a lane traffic count value stored in the memory once for each set of contiguous differences images for the lane that exceed the vehicle detection threshold for the lane.

In another embodiment, a method of counting traffic passing a camera overlooking a multi-lane roadway is disclosed. The method comprises receiving a plurality of video frames by a traffic analytics engine executing on a processor of a computer system, wherein the video frames are captured by the camera overlooking the multi-lane roadway; for each lane of the multi-lane roadway, analyzing the plurality of video frames by the traffic analytics engine and determining a pixel intensity variance background threshold for the lane as a product of a median pixel intensity value for the lane with a background factor that is less than 1.0; and for each lane of the multi-lane roadway, analyzing the plurality of video frames by the traffic analytics engine and determining video frames having a pixel intensity variance for the lane that is less than the pixel intensity variance background threshold for the lane. The method further comprises, for each lane of the multi-lane roadway, analyzing the video frames determined to have a pixel intensity variance for the lane that is less than the pixel intensity variance background threshold for the lane by the traffic analytics engine and determining a background reference frame for the lane; for each lane of the multi-lane roadway, analyzing the video frames by the traffic analytics engine and determines a difference image for each frame as the difference between a lane detection region corresponding to the lane within the frame and the background reference frame for the lane; and for each lane of the multi-lane roadway, determining a vehicle detection threshold for the lane by the traffic analytics engine based on the difference images of each frame for the lane. The method further comprises, for each lane of the multi-lane roadway, identifying by the traffic analytics engine difference images for the lane that exceed the vehicle detection threshold for the lane; and for each lane of the multi-lane roadway, incrementing by the traffic analytics engine a lane traffic count value stored in a memory of the computer system once for each set of contiguous differences images for the lane that exceed the vehicle detection threshold for the lane.

In yet another embodiment, a method of counting traffic passing a camera overlooking a roadway is disclosed. The method comprises receiving a plurality of video frames by a traffic analytics engine executing on a processor of a computer system, wherein the video frames are captured by the camera overlooking the multi-lane roadway; determining a mask that defines a lane detection region by the traffic analytics engine based on an assumed average length of a vehicle, based on a known pan-tilt-zoom value associated with the camera, and based on analyzing lane boundary markers in the video frames; and determining a background reference frame in the lane detection region by the traffic analytics engine by applying the mask to the video frames and by averaging the pixels of the masked video frames. The method further comprises determining that at least some of the masked video frames differ from the background reference frame by more than a detection threshold; and incrementing a traffic count associated with the lane detection region stored in a memory of the computer system based on the masked video frames that differ from the background reference frame by more than the detection threshold.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
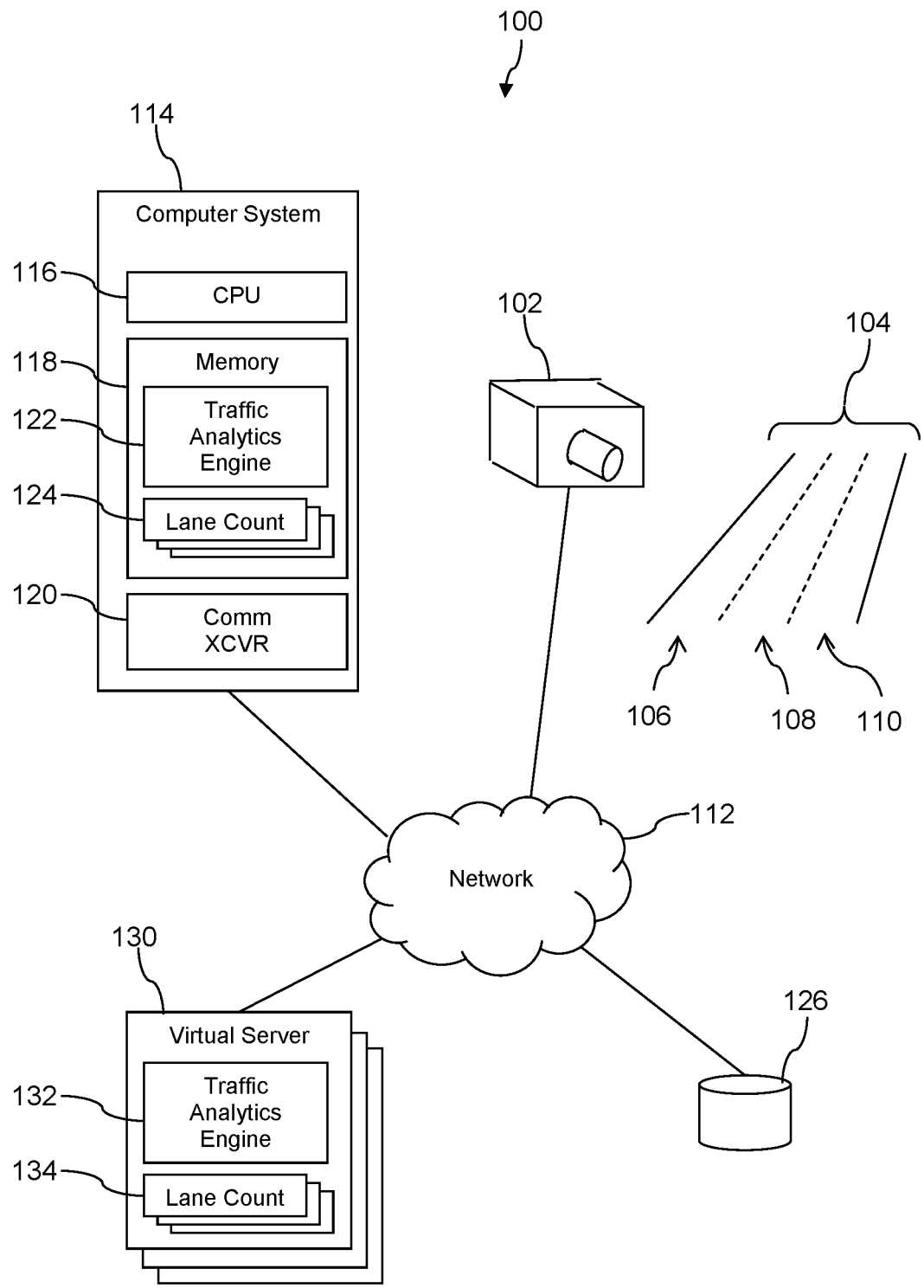
- FIG. 1 is a block diagram of a system according to an embodiment of the disclosure.
Figure 2A:
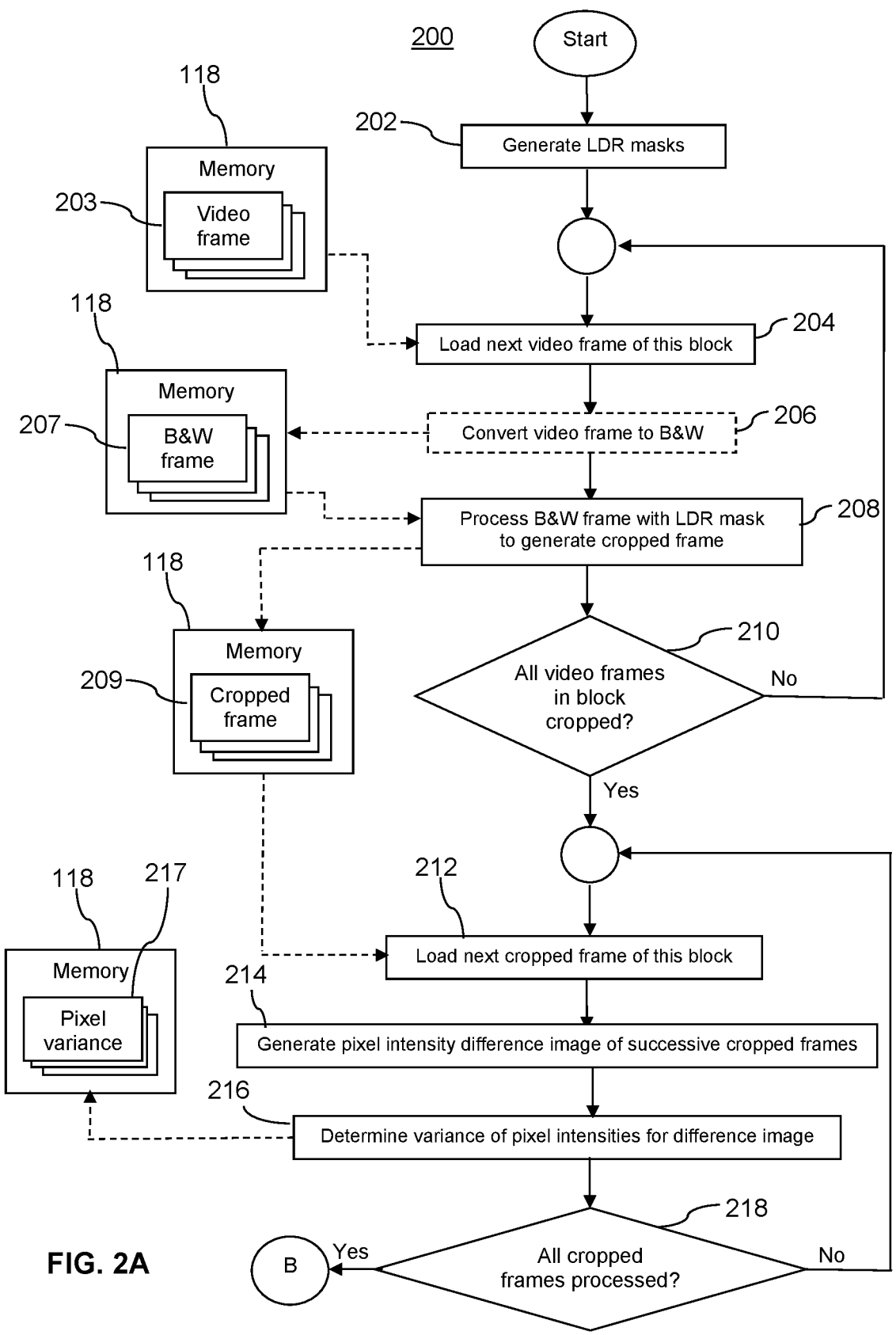
FIG. 2A, FIG. 2B, FIG. 2C, and FIG. 2D is a flow chart of a method according to an embodiment of the disclosure.
Figure 2B:
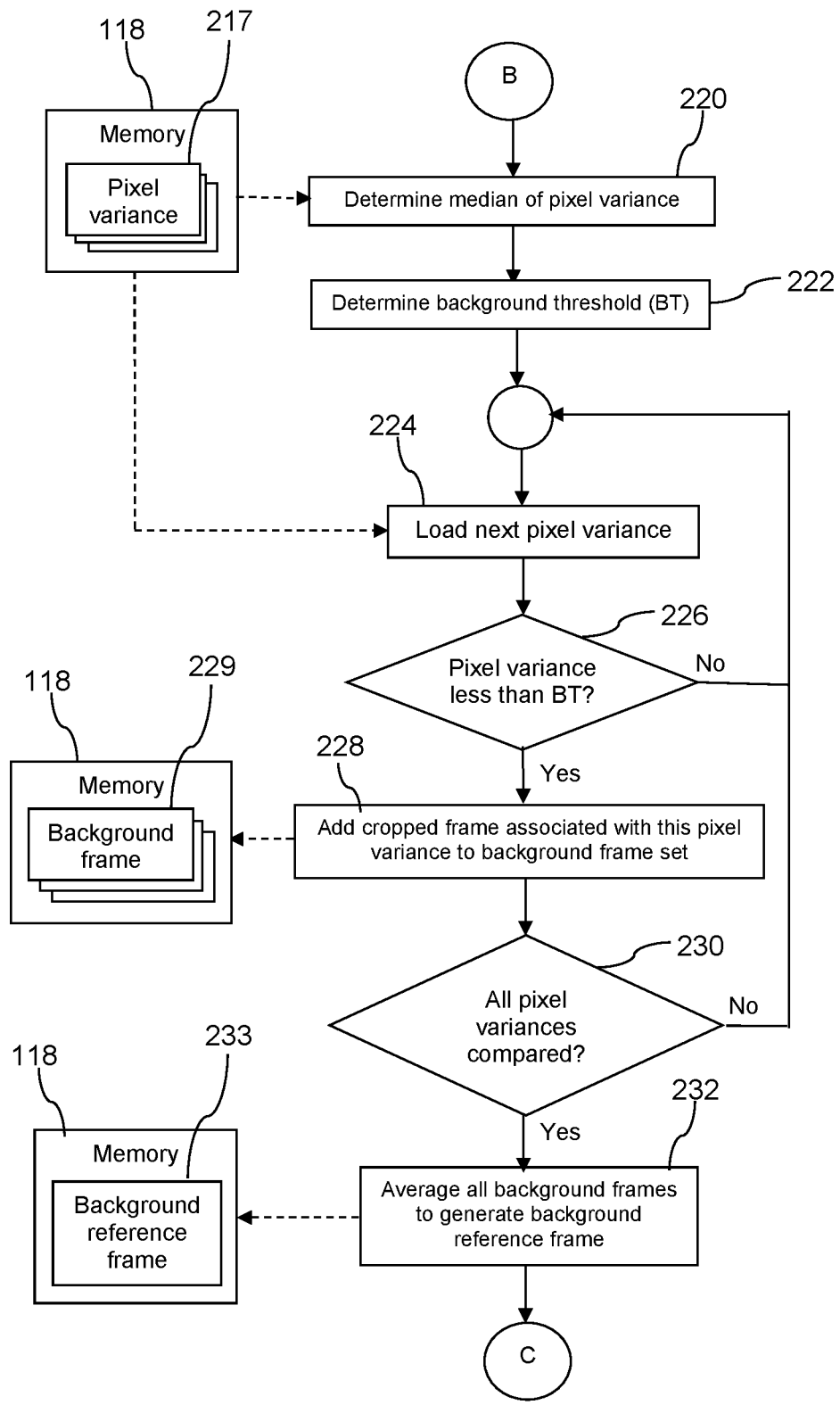
Figure 2C:
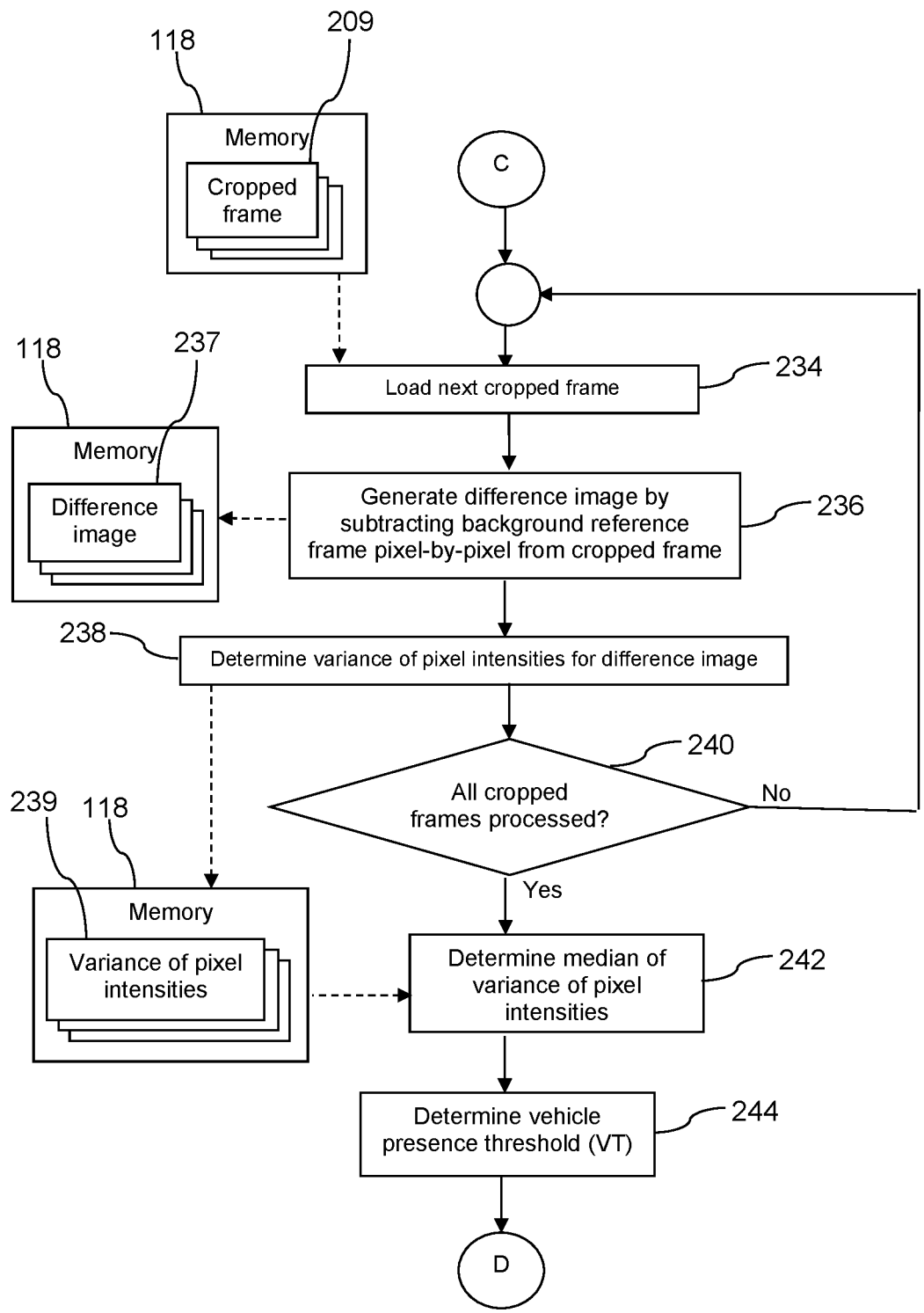
Figure 2D:
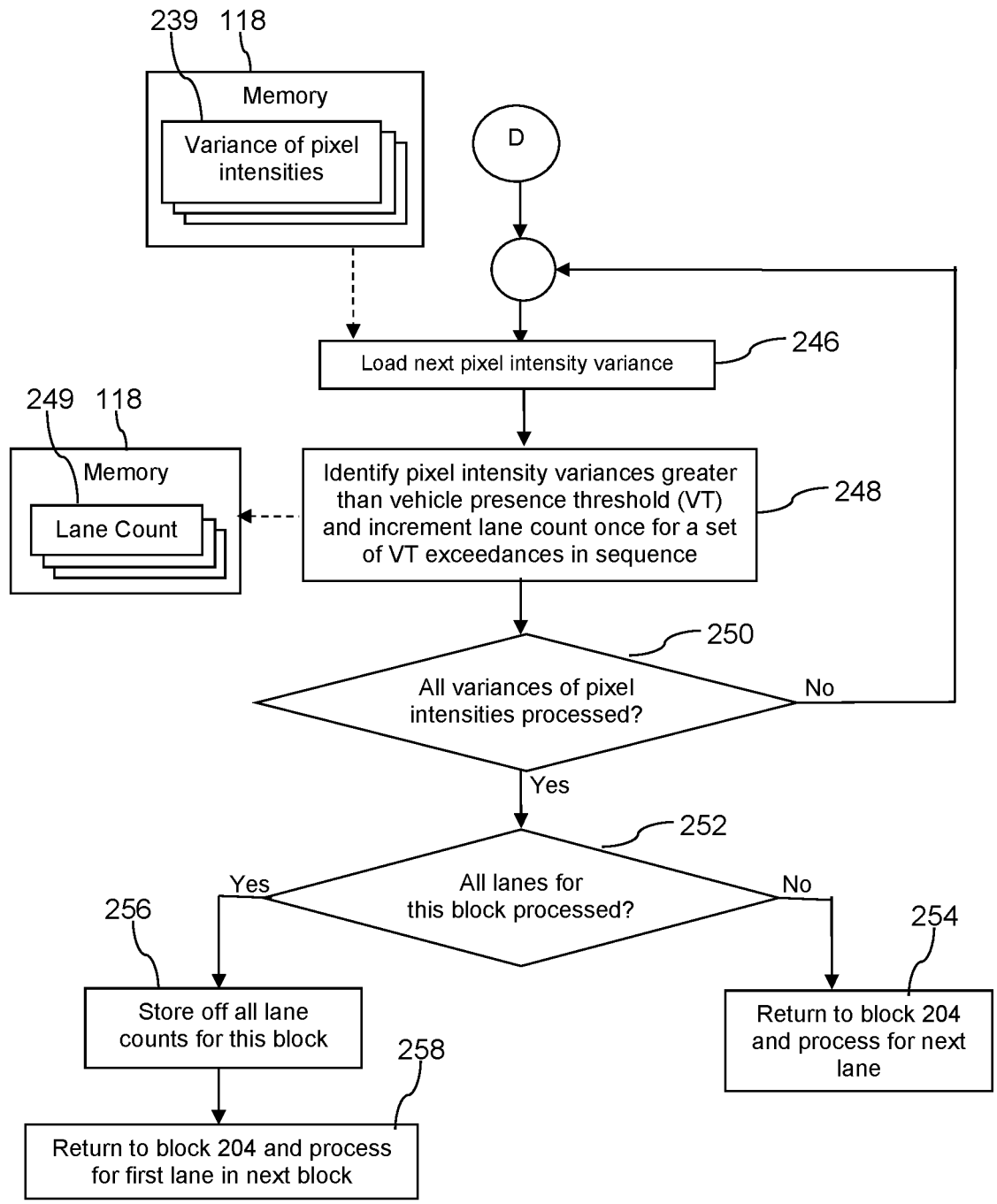

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a traffic detection system using machine vision and/or digital image processing. Video frames (e.g., video data) from one or more video cameras overlooking one or more lanes of a roadway are retrieved and processed by a traffic analytics engine executing on a processor of a computer system to automatically detect and count vehicles passing the overlook point. On initiation, the traffic analytics engine determines a mask that defines a lane detection region for each of the one or more lanes of the roadway at the overlook point. This determination is made based on a pre-defined or pre-configured average vehicle length and based on digitally detecting lane border markings in the video data. Once this mask is defined, it can be stored and reused for any desired length of time. Alternatively, in another embodiment, the vehicle length is not pre-configured but instead is derived by analysis of some of the video frames by the traffic analytics engine, for example by analysis of a small number of the video frames such as five video frames, ten video frames, fifteen video frames, twenty video frames, thirty video frames, forty video frames, or some other number of video frames less than sixty video frames. In an embodiment, the bit values of pixels of the mask corresponding to the lane detection region are assigned all binary '1' values (e.g., a value of 255 for pixel intensity values encoded using 8 bits) and the bit values of pixels of the mask outside of the lane detection region are assigned all binary '0' values. When this mask is logically ANDed with pixel intensity values of a video frame, all pixel intensity values outside of the mask are forced to '0' values while the pixel intensity values inside of the mask are retained unchanged.

The traffic analytics engine determines a background reference frame for each of the detection regions by applying the mask to a plurality of video frames and averaging the masked pixel intensity values for each pixel position in the video frames. In an embodiment, a process is employed that selectively uses video frames deemed to not contain a vehicle in the lane detection region when determining the background reference frame, whereby to better define the background reference frame—that is, the background is better distinguished from a foreground that includes an image of a vehicle. In another embodiment, however, the determination of the background reference frame does not bother to exclude video frames that may contain a vehicle.

The traffic analytics engine compares masked video frames to the background reference frame. If there is a significant difference (e.g., a variance greater than a detection threshold), the traffic analytics engine deems this to detect the presence of a vehicle. Human vision is able to distinguish foreground images from background. The traffic analytics engine described herein uses a computational statistical process to determine algorithmically a background and to determine when a foreground image varies from the background in a process that may be called machine vision by analogy to human vision's ability to distinguish foreground from background. It is understood that this does not mean that human beings are able to perform the computational statistical process described herein manually: this is inherently a kind of processing performed by a computer system or a semiconductor processor-based system. The premise is that vehicles look different—in machine vision as well as in human vision—from the background reference frame. A vehicle is detected—by the machine vision implemented by the traffic analytics engine—as foreground that is different from (e.g., contrasts with) the background.

The video frames are ordered in a sequence according to time. Contiguous masked video frames deemed to detect the presence of a vehicle are deemed the same vehicle detection event, a single count increment is tolled for these contiguous masked video frames, and a timestamp for the vehicle count is generated based on a middle one of the contiguous masked video frames deemed to have detected the presence of a vehicle. This same processing is performed for each of a plurality of lanes when multiple lanes are present in the video data. It is an advantage of this particular approach that detecting different length vehicles is not a problem for the traffic analytics engine. A sub-compact car manifests as a smaller number of contiguous masked video frames deemed to have detected the presence of a vehicle; a semi-truck manifests as a larger number of contiguous masked video frames deemed to have detected the presence of a vehicle.

The disclosed traffic detection system avoids much of the complexity of alternative vehicle detection systems and hence provides a significantly more efficient computational solution. The disclosed traffic detection system analyzes the video frames holistically. It does not binarize the video frames. Other traffic detection systems may apply brute force methods that depend on complex neural network processing and/or machine learning methods that are frankly overkill for the constrained object of detecting presence of vehicles. Some traffic detection systems partition their solution into (a) locating, (b) classifying, (c) motion tracking, and (d) then declaring a vehicle detection event and tolling a vehicle count. The disclosed traffic detection system avoids the complexity of this locating/classifying/motion tracking/detection process and hence is much more efficient than these alternatives.

Turning now to FIG. 1, a system 100 is described. In an embodiment, the system 100 comprises a video camera 102 mounted in a position to overlook a multi-lane roadway 104. While the roadway 104 depicted in FIG. 1 has three lanes comprising a first lane 106, a second lane 108, and a third lane 110, in other embodiments, the video camera 102 may overlook a single lane, two lanes, four lanes, five lanes, six lanes, seven lanes, eight lanes, or some other number of roadway lanes less than fifty lanes.

In an embodiment, the lanes 106, 108, 110 overlooked by the video camera 102 are configured for vehicle traffic flowing in a single direction (e.g., traffic approaching the video camera 102 or traffic receding from the video camera 102). In another embodiment, however, some of the lanes 106, 108, 110 may be configured for traffic moving towards the video camera 102 and others of the lanes 106, 108, 110 may be configured for traffic moving away from the video camera 102. It is understood that the term roadway includes highways, expressways, turnpikes, roads, dirt roads, gravel roads, four-wheel drive roads, and other pathways used for vehicles. The term roadway includes both public roadways and private roadways.

The video camera 102 captures video frames at 24 frames per second, at 30 frames per second, or at some other frame rate. In an embodiment, the video camera 102 may be an infrared video camera. Each video frame comprises a matrix of pixel intensity values. Each pixel intensity value may be represented as a black and white value (e.g., gray scale images) or may be represented as a color value. For example, a color pixel intensity value may be represented by a red pixel intensity value, a green pixel intensity value, and a blue pixel intensity value. In an embodiment, each red color pixel intensity value may be represented by 8 bits of binary values (e.g., each color pixel intensity value ranges from 0 at low intensity to 255 at high intensity), each green pixel intensity value may be represented by 8 bits, and each blue pixel intensity value may be represented by 8 bits. In another embodiment, a different number of bits may be used to represent red pixel intensity values, green pixel intensity values, and blue pixel intensity values. In an embodiment, black and white pixel intensity values may be represented by 8 bits, and black and white pixel intensity values range from 0 at low intensity (no light or black) to 255 (maximum brightness) at high intensity. Black and white pixel intensity values may also be referred to as grayscale pixel intensity values.

In an embodiment, the video frames may have 1080 rows of pixels and 1920 columns of pixels. In an embodiment, the video frames may have 720 rows of pixels and 1280 columns of pixels. In an embodiment, the video frames may have 480 rows of pixels and 640 columns of pixels. In other embodiments, however, a different pixel matrix schema for the video frames may be used. The video camera 102 may be connected to a network 112 that comprises one or more public networks, one or more private networks, or a combination thereof. The video camera 102 may store video frames in a data store 126 and this may be referred to as raw video.

The system 100 may further comprise a computer system 114 that comprises a processor 116, a memory 118, and a communication transceiver 120. The computer system 114 may be located physically proximate to the video camera 102, for example within 20 feet of the video camera 102. In an embodiment, the processor 116 may be a microprocessor, a digital signal processor (DSP), a graphics processor unit (GPU), a complex programmable logic device (CPLD), a field programmable gate array (FPGA), or an application specific integrated circuit. The processor 116 may comprise two or more separate processor packages. The processor 116 may comprise two or more core processors contained in a single package. The processor 116 may comprise a mix of different types of processors, either in separate packages or in a single package, for example both a microprocessor and a GPU, for example both a microprocessor and a DSP, for example both a DSP and a GPU, or some other combination of two or more different kinds of processors.

The computer system 114 can be ruggedized to protect it against the elements (e.g., disposed in a weather-tight box) and a wide range of temperature variation. In an embodiment, the computer system 114 may be embedded within the video camera 102. Alternatively, the computer system 114 may be located physically remote from the video camera 102, for example in an office building. The memory 118 stores a traffic analytics engine 122, in a non-transitory portion of the memory 118, that may be executed by the processor 116 to detect the presence of vehicles and to generate lane counts 124 based on analyzing the video frames produced by the video camera 102. The traffic analytics engine 122 comprises executable instructions and may be installed as software or firmware in a non-volatile portion the memory 118. The traffic analytics engine 122 may comprise data along with the instructions. In an embodiment, the traffic analytics engine 122 may be derived from one or more scripts, one or more computer programs, and/or one or more binary files.

The traffic analytics engine 122 can analyze video frames produced by the video camera 102 to detect the presence of vehicles in different lanes of the roadway 104. Lane counts are counts of vehicles that pass a pre-defined location in a given lane of the roadway 104. For example, the lane counts 124 may comprise a first lane count for the first lane 106, a second lane count for the second lane 108, and a third lane count for the third lane 110. In an embodiment, the system 100 may comprise a video camera 102 overlooking a railroad track or a light-rail track, and the traffic analytics engine 122 analyzes video frames produced by the video camera 102 to detect the presence of trains of railroad cars or trains of light-rail cars and counts the trains that pass the video camera 102.

In an embodiment, the system 100 may not include the computer system 114, the traffic analytics engine 122 and the lane counts 124 and instead may rely upon one or more virtual servers 130 executing in a cloud computing environment that executes a traffic analytics engine 132 to generate lane counts 134. The traffic analytics engine 132 is substantially similar to the traffic analytics engine 122. Basically, whether the system 100 relies on executing the traffic analytics engine 122 on the computer system 114 or relies on executing the traffic analytics engine 132 on one or more virtual servers 130 is an implementation decision, and in different circumstances, a different implementation may be chosen. For example, in a large municipality, it may be desired to place the traffic analytics engine 132 in a cloud computing environment (e.g., execute on one or more virtual servers 130) in order to avoid capital equipment costs and to provide a readily scalable solution. Additionally, a municipality may be using cloud computing resources for performing other computing operations and may interleave these other computing operations with the traffic analytics engine 130 processing to make more efficient use of its contracted cloud computing service. On the other hand, a small municipality may prefer to rely on the computer system 114 located in the city hall for better control of traffic count data and/or to protect privacy data. A small municipality may also choose to locate a different computer system 114 at each of a plurality of video camera 102 locations and have each of the traffic analytics engines 122 transmit the lane count data to be stored in the data store 126 that may also retain the raw video.

In an embodiment, the traffic analytics engine 122 accesses a block of contiguous video frames (e.g., raw video), processes this block of contiguous video frames to detect vehicle present events and to generate lane counts, stores the lane counts, and then repeats the process with successive blocks of contiguous video frames. For example, the traffic analytics engine 122 may access a contiguous block of two minutes of video frames and develop lane counts for this two minutes of video then repeat the process to develop lane counts for the next two minutes of video and so forth. In an embodiment, the contiguous block of video frames may be one minute of contiguous video, ninety seconds of contiguous video, one hundred fifty seconds of contiguous video, three minutes of contiguous video, four minutes of contiguous video, five minutes of contiguous video, seven minutes of contiguous video, ten minutes of contiguous video, fifteen minutes of contiguous video, thirty minutes of contiguous video, forty-five minutes of contiguous video, an hour of contiguous video, or some other duration of contiguous video less than two days of video.

Turning now to FIG. 2A, FIG. 2B, FIG. 2C, and FIG. 2D, a method 200 of detecting vehicle present events and of generating lane counts 124 is described. While the description below describes the method 200 as being performed mostly by the traffic analytics engine 122 executing on the processor 116 of the computer system 114, it is understood that the same processing instead may be performed mostly by the traffic analytics engine 132 executing on one or more virtual servers 130 in a cloud computing environment. It will be appreciated that the method 200 can be implemented with slight variations to benefit from processing efficiencies. Some of these alternatives are pointed out in the description below, but other modifications of method 200 are also contemplated by and comport with the spirit of the present disclosure. The flowcharts and accompanying description have been developed mainly with a view to clarifying the methodological approach. Detection of vehicle presence events and generation of lane counts 124 by the traffic analytics engine 122/132 may vary somewhat from this description.

At block 202, the traffic analytics engine 122 generates a lane detection region (LDR) mask for each of the lanes that are overlooked by the video camera 102. Given the roadway 104 having three lanes, the traffic analytics engine 122 would generate three LDR masks, a first LDR mask for the first lane 106, a second LDR mask for the second lane 108, and a third LDR mask for the third lane 110. If the video camera 102 overlooks a different number of lanes, the traffic analytics engine 122 will generate a different number of LDR masks. Each LDR mask defines a portion of the lane that will be analyzed by the traffic analytics engine 122 to determine, through application of statistics, if a vehicle is present or not within the lane detection region. The traffic analytics engine 122 may request and receive a plurality of video frames, for use in determining the LDR masks, from the video camera 102 and/or from the data store 126 where video frames produced by the video camera 102 are stored.

In an embodiment, the LDR mask corresponds to a trapezoidal region in the video frames received by the traffic analytics engine 122 from the video camera 102. The trapezoidal shape results from perspective effects in the video frames. The traffic analytics engine 122 defines an average vehicle length and identifies lane boundaries by analyzing video frames to locate the lane boundaries. Using the average vehicle length and the lane boundaries, the traffic analytics engine 122 defines the LDR mask. In an embodiment, the traffic analytics engine 122 defines the LDR mask further based on a known elevation of the video camera 122 above the roadway 104 and based on a known pan-tilt-and zoom value associated with the video camera 102.

In an embodiment, the LDR mask comprises a pixel matrix (e.g., 1080×1920 pixels, 720×1280 pixels, 480×640 pixels, or some other pixel matrix schema) where pixels disposed within the LDR are assigned all binary '1' values (e.g., for a black and white pixel represented with 8 bits, a binary value of 255) and pixels disposed outside the LDR are assigned all binary '0' values. In this way, the video frames can be processed by logically ANDing the LDR mask and the video frame to pass the portion of the video frame corresponding to the LDR and zeroing the portion of the video frame outside the LDR. In a different embodiment, the LDR mask assigns a value of '1' (e.g., an unsigned binary value of 1 or '00000001') to each pixel disposed within the LDR and assigns a value of '0' (e.g., an unsigned binary value of 0 or '00000000') to each pixel disposed outside the LDR. In this way, the video frames can be processed by arithmetically multiplying the LDR mask times the video frame, pixel-by-pixel, to pass the portion of the video frame corresponding to the LDR and zeroing the portion of the video frame outside the LDR.

The processing of block 202 can be done once on initiation of the traffic analytics engine 122 and stored in memory 118 for use until the traffic analytics engine 122 is powered down and/or restarted. Alternatively, the processing of block 202 can be done once, the LDR mask can be stored in a non-volatile portion of the memory 118, and the LDR mask can be reused indefinitely until the traffic analytics engine 122 is triggered to redetermine the LDR mask(s). It is noted that if the video camera 102 configuration is changed, if the elevation of the video camera 102 above the roadway 104 is changed, or if the PTZ configuration of the video camera 102 installation is changed, it may be desirable to trigger the traffic analytics engine 122 to repeat the processing of block 202 to determine the LDR mask(s).

At block 204, the traffic analytics engine 122 may load the first of the video frames 203 of a block of video being processed. The processing of block 204 may comprise the traffic analytics engine 122 receiving a block of contiguous video frames from the video camera 102, for example two minutes of contiguous video frames. The processing of block 204 may comprise the traffic analytics engine 122 reaching out to and retrieving a block of contiguous video frames from the data store 126. The traffic analytics engine 122 may store the block of contiguous video frames in the memory 118, for example in a volatile portion (e.g., a transitory portion) of the memory 118. Loading the video frame may then comprise retrieving one of the video frames by the traffic analytics engine 122 from the memory 118 into a process memory region of the memory 118 dedicated for use of the traffic analytics engine 122. Alternatively, in another embodiment, the traffic analytics engine 122 may not load a block of contiguous video frames and instead may retrieve video frames associated with the same block of video frames one at a time—to load the video frame at block 204—from the video camera 102 or from the datastore 126.

At block 206, the traffic analytics engine 122 may convert a video frame 203 from a color frame to a black and white (B&W) video frame 207 and stores the B&W frame 207 in the memory 118. The conversion of a color frame may involve, for each pixel of the video frame 203, summing the color values of the pixel and dividing by the number of different color values to generate what is effectively an average of the color pixel intensities. In an embodiment where the video camera 102 provides video frames that are already in B&W format, the processing of block 206 may be omitted. It is noted that, in an embodiment, the processing of block 204 and 206 may be completed only once for a given block of video frames 203. In another embodiment, the video frames 203 may be in color format and the processing by method 200 may process the video frames 203 in color. In this case, again, the block 206 of converting color video frames to B&W video frames 207 would be omitted. Processing video frames 203 in color may be more complicated but may provide advantages in processing video frames 203 captured by the video camera 102 at night. In this case, for analyzing and detecting receding vehicles, red brake lights of vehicles may provide an enhanced visual distinction relative to a roadway background that improves vehicle detection accuracy.

In an embodiment, before the processing of block 206, the traffic analytics engine 122 may perform a digital image stabilization on the video frames 203 to remove the effect of physical motion of the video camera 102 that might otherwise introduce inaccuracies in the machine vision processing. The traffic analytics engine 122 may identify an anchor point in a plurality of video frames, for example a lane marker segment, signage on the side of the roadway, or some other fixed object. The traffic analytics engine 122 may then determine a shift of the anchor point in the video frames 203 relative to a pre-defined fixed location of the anchor point (e.g., due to physical motion of the video camera 102, for example due to wind or vibration of a support structure retaining the video camera 102) and shift all the pixel values in the video frame 203 to cancel this shift of the anchor point. In an embodiment, digital image stabilization may be performed between the processing of block 204 and of block 206. In an embodiment, digital stabilization may be performed integrally with the loading of the next video frame 203 in block 204.

In an embodiment, the processing at block 204 or at block 206 may thin out video frames 203 by deleting pixel values to reduce the total number of pixel values of the video frames 203 to be processed. For example, every other pixel may be deleted from the video frames 203 to reduce the total pixel count of the video frames 203 by fifty percent. For example, two of every three pixels may be deleted from the video frames 203 to reduce the total pixel count of the video frames 203 by sixty-six percent. For example, three of every four pixels may be deleted from the video frames 203 to reduce the pixel count of the video frames 203 by seventy-five percent. These thinned video frames 203 may still support good accuracy of vehicle detection and lane counts. When thinning of video frames 203 is employed, the LDR masks are adapted accordingly. Thus, if pixel values of the video frames 203 are deleted, corresponding pixel values of the LDR masks are likewise deleted.

At block 208, the traffic analytics engine 122 processes the B&W video frame 207 (or the color video frame) to generate what may be referred to as a cropped frame 209 associated with one of the lanes of the lanes 106, 108, 110. In some contexts, the cropped frame 209 may be referred to as a segmented frame region or as a masked video frame. The cropped frame 209 may be formed by logically ANDing each pixel intensity value of the video frame 203 with the corresponding pixel value of the appropriate LDR mask (e.g., the one of the LDR masks associated with the one lane of lanes 106, 108, 110 that is currently being processed by the method 200 at block 208), thereby setting all pixel intensity values of the cropped frame 209 outside the LDR to '0' values and preserving the pixel intensity values inside the LDR unchanged. In some cases, the term 'pixel value' or the term 'pixel intensity' may be used in place of the term 'pixel intensity value' but it is understood that these terms are interchangeable and mean the same thing. In an embodiment, rather than forming the cropped frame 209 by logically ANDing each pixel value of the video frame 203 with the corresponding pixel value of the LDR mask (for example, in the case where the pixel values of the LDR mask are binary '0' values ('00000000' binary) or binary '1' values ('00000001' binary)), the cropped frame 209 may be formed by arithmetically multiplying each pixel intensity value of the video frame 203 times the corresponding pixel value of the appropriate LDR mask.

The analytics engine 122 stores the cropped frame 209 in the memory 118. At block 210, if all the video frames 203 have not been processed, processing returns to block 204. If all the video frames 203 have been processed, the method 200 proceeds to block 212. It is noted that each cropped frame 209 is associated with the one video frame 203 from which it is derived by processing (either logically ANDing or arithmetically multiplying, as the case may be) with the appropriate LDR mask.

In an embodiment, each cropped frame 209 comprises the same number of pixels as the video frame 203 from which it is derived, where the great majority of the pixel intensity values in the cropped frame 209 are '0' values, because most of the cropped frame 209 lies outside the lane detection region. The area that lies outside the lane detection region may amount to about 92% of the content of the cropped frame 209. Said in other words, only 8% of the data stored in the cropped frame 209 is meaningful. But yet the remaining 92% of the irrelevant data will consume space in the memory 118 and be processed by the traffic analytics engine 122. The irrelevant data—the irrelevant '0' values—is the data that lies outside the LDR mask associated with the lane being processed which has been forced to the '0' value by processing the video frame 203 with the LDR mask. It is understood that some pixel intensity values of the cropped frame 209 inside the trapezoidal LDR may be '0' value, but these are not considered irrelevant '0' values because those are the values that are in the video frame 203—these '0' values have not been forced to the '0' value by processing with the LDR mask.

In another embodiment, the traffic analytics engine 122 creates an improved cropped frame 209 which, in effect, creates a sub-image of the initially cropped image that contains a rectangular area within the initially cropped image that minimally encloses the trapezoidal region of the LDR mask. While this minimal rectangular area will still include some areas excluded by the LDR mask, it will contain only a small portion of the irrelevant '0' value pixels. The traffic analytics engine 122 can define a boundary of this cropped frame 209 as comprising a first number of rows and a second number of columns, attach this information to a data structure containing the pixel intensity values of this cropped frame 209, and use this data structure for processing cropped frames 209 as described below. This enhanced form of the cropped frame 209 can realize significant savings of memory and processing. In an embodiment, the improved cropped frame (or reduced cropped frame) comprises less than twenty percent of the number of pixel intensity values in the video frames 203 and/or the B&W frames 207. In an embodiment, the improved cropped frame comprises less than ten percent of the number of pixel intensity values in the video frames 203 and/or the B&W frames 207. In the discussion that follows, the cropped frames 209 may be either the larger cropped frame containing many '0' values or the cropped frames 209 comprises a sub-image of the initial cropped frame that has eliminated most of the irrelevant '0' values outside of the trapezoidal area of the LDR mask.

At block 212, in a first pass through block 212 for this one of the lanes 106, 108, 110, the first cropped frame 209 and the second cropped frame 209 are loaded by the traffic analytics engine 122 for processing. If this is not the first pass through block 212 for this one of the lanes 106, 108, 110, the next cropped frame 209 is loaded by the traffic analytics engine 122 for processing. At block 214, the traffic analytics engine 122 generates a pixel intensity difference image by subtracting the previously loaded cropped frame 209 from the next loaded cropped frame 209. Thus, the traffic analytics engine 122 subtracts the pixel intensity values of the prior cropped frame 209 from the corresponding pixel intensity values of the next cropped frame 209, pixel-by-pixel, to define the pixel intensity difference image. For regions of the pixel intensity difference image outside the LDR, the pixel intensity values are '0' and for regions of the pixel intensity difference image inside the appropriate LDR, the pixel intensity values are the difference values. The difference values basically capture a contrast between the LDR regions of the two successive cropped frames 209. At block 216, a variance of the pixel intensity values of the difference image is determined by first determining a mean of the pixel intensity values of the difference image, by secondly subtracting the mean pixel intensity value of the difference image from each of the pixel intensity values of the difference image, by thirdly squaring this difference, and by fourthly finding the mean value of these squared differences which is the pixel intensity variance value of the difference image represented as $\sigma_1^2$. The pixel intensity variance $\sigma_1^2$ of this difference image is stored as a pixel intensity variance $(\sigma_1^2)$ 217 in the memory 118. In an embodiment, once its associated pixel intensity variance $(\sigma_1^2)$ 217 is determined, the difference image can be deleted from memory 118.

At block 218, if all the cropped frames 209 associated with this one of the lanes 106, 108, 110 have not been processed to generate a difference image and associated pixel intensity variance $\sigma_1^2$, the method 200 returns to block 212. If all the cropped frames 209 associated with this lane have been processed, the method proceeds to block 220. It is noted, in an embodiment, that the number of pixel intensity variances $(\sigma_1^2)$ 217 is one less than the number of cropped frames 209. In an embodiment, the first pixel intensity variance $(\sigma_1^2)$ 217 may be associated with the second cropped frame 209, the second pixel intensity variance $(\sigma_1^2)$ 217 may be associated with the third cropped frame 209, and the last pixel intensity variance $(\sigma_1^2)$ 217 may be associated with the last cropped frame 209. Thus, in this illustration, there is no pixel intensity variance $(\sigma_1^2)$ 217 associated with the first cropped frame 209.

At block 220, the traffic analytics engine 122 determines the median value of all the pixel intensity variances $(\sigma_1^2)$ 217 (e.g., a median pixel intensity value for this one of the lanes 106, 108, 110). At block 222, the traffic analytics engine 122 determines a background threshold (BT) for this one of the lanes 106, 108, 110 by multiplying the median value of pixel intensity variances $(\sigma_1^2)$ 217 by a background factor. In an embodiment, the background factor is less than 1.0. In an embodiment, the background factor is 0.5, 0.6, 0.7, 0.8, or 0.9. In another embodiment, the background factor is a value in the range including 1.0 and extending to include 2.0. In some contexts, the background threshold (BT) may be referred to as a pixel intensity variance background threshold.

At block 224 a first one of the pixel intensity variances $(\sigma_1^2)$ 217 is loaded. At block 226 if the loaded pixel intensity variance $(\sigma_1^2)$ 217 is less than the background threshold (BT), the processing proceeds to block 228 where the cropped frame 209 associated with this pixel intensity variance $(\sigma_1^2)$ 217 is added to a background frame set as background frame 229. At block 230, if all pixel intensity variances $(\sigma_1^2)$ 217 have not been compared to the background threshold (BT), the processing returns to block 224 where the next pixel intensity variance $(\sigma_1^2)$ 217 in sequence is loaded. Otherwise processing proceeds to block 232.

At block 226, if the pixel intensity variance $(\sigma_1^2)$ 217 is equal to or greater than the background threshold (BT) the processing returns to block 224 where the next pixel intensity variance $(\sigma_1^2)$ 217 in sequence is loaded. In this case, the cropped frame 209 associated with the pixel intensity variance $(\sigma_1^2)$ 217 that is equal to or greater than the background threshold (BT) is deemed unsuitable for inclusion in the background frame set because it is untypical of a neutral background video frame (e.g., a video frame that does not have a vehicle present in the detection region of the lane being analyzed). Said in other words, the cropped frame associated with a pixel intensity variance $(\sigma_1^2)$ 217 that is equal to or greater than the background threshold (BT) exhibits a notable difference from neighboring cropped frames 209 (this operation is performed at block 214 where a difference image between two successive cropped frames 209 is determined). This may be because this cropped frame 209 is associated with presence of a vehicle in this LDR.

At block 230, if all pixel intensity variances $(\sigma_1^2)$ 217 have been compared to the background threshold (BT), the processing proceeds to block 232. At this point, in an embodiment, the pixel intensity variances $(\sigma_1^2)$ 217 may be deleted from memory 118, as they will not be used further in the processing of this block of video frames 203. At block 232, the pixel intensity values of all the background frames 229 are averaged, pixel-by-pixel, to generate a background reference frame 233. The pixels in the portion of the background frames 229 outside of the LDR are all '0' value. The average of the pixels in the portion of the background frames 229 inside of the LDR produce a normalized image presumed to not be based on a vehicle in the LDR.

At block 234, the first cropped frame 209 is loaded. At block 236, the background reference frame 233 is subtracted, pixel-by-pixel, from the cropped frame 209 that is loaded to produce a difference image 237 associated with the cropped frame 209 and also associated with the B&W video frame 207 and the video frame 203 the cropped frame 209 is derived from. Note that the difference images 237 are different from the difference images generated at block 214 described above. This difference image 237 is stored in the memory 118. At block 238, a variance of pixel intensity values in the difference image 237 determined in block 236 is determined by first determining a mean pixel intensity value of the difference image 237 determined in block 236, by secondly subtracting this mean pixel intensity value from each of the pixel intensity values in the difference image 237 determined in block 236, by thirdly squaring this difference, and by fourthly finding the mean value of these squared differences which is the variance of the pixel intensity values of the difference image 237 determined in block 236 and is represented as a pixel intensity variance $\sigma_2^2$. The pixel intensity variance $(\sigma_2^2)$ is stored as a pixel intensity variance $(\sigma_2^2)$ 239 in the memory 118. Note that the pixel intensity variance $(\sigma_2^2)$ 239 determined at block 238 is different from the pixel intensity variance $(\sigma_1^2)$ 217 determined above at block 216.

In an embodiment, the signature of the presence of a vehicle is high variation in pixel intensity values after the background reference frame 233 has been subtracted from the cropped frame 209, which is the pixel intensity variance $(\sigma_2^2)$ 239 found in block 238. It will be understood that other signatures may be defined for deeming a vehicle detection event and be compatible with this system 100 and method 200. Two examples can show the advantage of using the high values of the pixel intensity variance ($\sigma_2^2$) 239 as the signature of the presence of a vehicle. As a first example, consider a frame to be analyzed for a detection region some time after the background image is determined. There is cloud cover in the frames that make up the background frame set, but not so in the frame to be analyzed. Let us say there is no vehicle in this frame to be analyzed. Then, all the pixel intensity values get lifted up in this frame due to lack of cloud cover. The difference image would have significant values, but variance would not increase much. Since we rely on variance, the lack of a boost in variance will be a good indicator of no vehicle. As a second example, suppose the roadway 104 has some arbitrary marks (patchwork) in a detection region. The background will have some variance floor. Since when coming up with the background set, successive frames are subtracted, the high variance floor of the raw frames do not make them counted out from the background set. However, when the frames to be analyzed are subtracted by the averaged background set, the variance of the resulting frames will be low in the absence of a foreground vehicle and high in the presence of one.

At block 240, if not all cropped frames 209 have been processed, the processing returns to block 234 where the next cropped frame 209 in sequence is loaded and the processing of blocks 236, 238 and 240 repeats. At block 240, if all the cropped frames 209 have been processed, the processing proceeds to block 242. At block 242, a median value of the pixel intensity variances ($\sigma_2^2$) 239 is determined. At block 244, a vehicle detection threshold (VT) is determined as a vehicle detection factor times the median value of pixel intensity variances ($\sigma_2^2$) 239. In an embodiment, the vehicle detection factor is between 2 and 50. In an embodiment, the vehicle detection factor is between 3 and 40. In embodiment, the vehicle detection factor is between 4 and 30. In an embodiment, the vehicle detection factor is between 5 and 25. In an embodiment, the vehicle detection factor is between 10 and 20. In an embodiment, the vehicle detection factor is 16. In an embodiment, the vehicle detection factor may be a first value when processing video frames 203 captured during daylight hours and may be a second value when processing video frames 203 captured during night hours.

At block 246, the first pixel intensity variance ($\sigma_2^2$) 239 is loaded. At block 248, the loaded pixel intensity variance ($\sigma_2^2$) 239 is compared to the vehicle detection threshold (VT). If the loaded pixel intensity variance ($\sigma_2^2$) 239 is greater than the vehicle detection threshold (VT) (recall that the VT is several multiples greater than the median of variances of pixels ($\sigma_2^2$) 239), the video frame 203, the B&W video frame 207, and the cropped frame 209 associated with the loaded pixel intensity variance ($\sigma_2^2$) 239 is deemed to have a vehicle present in the LDR because there is a statistically significant difference between the pixel intensity values in the cropped frame 209 and the pixel intensity values in the normalized background reference frame 233. At block 250, if all the cropped frames 209 are not processed, the processing returns to block 246 and the next pixel intensity variance ($\sigma_2^2$) 239 in sequence is loaded. With reference to block 248, a succession of two or more instances of pixel intensity variances ($\sigma_2^2$) 239 exceeding the vehicle detection threshold (VT) are deemed to detect a vehicle presence and then, when a next pixel intensity variance ($\sigma_2^2$) 239 is found to be less than the vehicle detection threshold (VT), a lane count 249 associated with the one of the lanes 106, 108, 110 currently being processed is incremented by one. Said in other words, the first pixel intensity variance ($\sigma_2^2$) 239 determined to be below the threshold, after a contiguous succession of pixel intensity variances ($\sigma_2^2$) 239 determined to be above the vehicle detection threshold (VT) is deemed to delimit the end of a vehicle detection event.

In an embodiment, the processing of block 248 may be enhanced to improve vehicle detection accuracy in analyzing video frames 203 captured during night hours (e.g., from one hour after sundown to one hour before sunup the next day) by taking a sliding window average of pixel intensity variances ($\sigma_2^2$) 239 associated with a small number of successive pixel intensity variances ($\sigma_2^2$) 239 and substituting this average pixel intensity variance for performing the comparison to the vehicle detection threshold (VT). For example, the average may be determined over five successive pixel intensity variances ($\sigma_2^2$) 239 stored in the memory 118. These five pixel intensity variances ($\sigma_2^2$) 239 used for calculating this average could include the subject pixel intensity variance ($\sigma_2^2$) 239 that would ordinarily be compared to the vehicle detection threshold (VT) if the averaging enhancement were not being employed, the two pixel intensity variances ($\sigma_2^2$) 239 that precede the subject pixel intensity variance ($\sigma_2^2$) 239, and the two pixel intensity variances ($\sigma_2^2$) 239 that follow the subject pixel intensity variance ($\sigma_2^2$) 239. It is noted that these five pixel intensity variances ($\sigma_2^2$) 239 correspond to and are associated with the video frame associated with the subject pixel intensity variance ($\sigma_2^2$) 239, the two video frames preceding the video frame associated with the subject pixel intensity variance ($\sigma_2^2$) 239, and the two video frames following the video frame associated with the subject pixel intensity variance ($\sigma_2^2$) 239. It is then this average pixel intensity variance that is compared to the vehicle detection threshold (VT) to determine if the subject pixel intensity variance ($\sigma_2^2$) 239 detects the presence of a vehicle. When the next pixel intensity variance ($\sigma_2^2$) 239 is analyzed at block 248, the average is recalculated using a different set of successive pixel intensity variances ($\sigma_2^2$) 239, where the term "sliding window" relates to this changed set of pixel intensity variances ($\sigma_2^2$) 239 used to calculate the average. In another embodiment, three successive pixel intensity variances ($\sigma_2^2$) 239 may be used to determine the sliding window average of the pixel intensity variance, seven successive pixel intensity variances ($\sigma_2^2$) 239, or some other number of successive pixel intensity variances ($\sigma_2^2$) 239.

The lane counts 249 may be substantially the same as the lane counts 124 or 134 depicted in FIG. 1. Thus, an event of a vehicle presence (e.g., a vehicle passing through the LDR) is associated with a peaking or surging of values of pixel intensities ($\sigma_2^2$) 239 that begins and continues through a succession of time adjacent pixel intensities ($\sigma_2^2$) 239. A timestamp of this lane count increment is determined based on a timestamp of the middle one of the cropped frames 209 associated with the sequence of pixel intensity variances ($\sigma_2^2$) 239 having a value above the vehicle detection threshold (VT) and this timestamp is stored in the memory 118. The timestamp may comprise a time of a video frame 203. The timestamp may represent a time and/or a frame number. The time of the timestamp may represent a date and time.

At block 250, if all the variances of pixels ($\sigma_2^2$) 239 have been processed, the processing proceeds to block 252. Note that if all pixel intensity variances ($\sigma_2^2$) 239 have been processed, the lane count 249 for this one of lanes 106, 108, 110 has been completed for this block of video frames 203 being analyzed by the traffic analysis engine 122. In an embodiment, the completed lane count 249 and associated timestamps of vehicle presence events for this one of lanes 106, 108, 110 may be written to the data store 126 and the lane count 249 may be deleted from memory 118. Additionally, the various intermediate results of processing the lane count 249 for this one of lanes 106, 108, 110 (e.g., the cropped frames 209, the pixel intensity variances ($\sigma_1^2$) 217, the background frames 229, the background reference frame 233, the pixel intensity variances ($\sigma_2^2$) 239, the background threshold (BT), and the vehicle detection threshold (VT)) may be deleted from the memory 118. Note that in an embodiment, the video B&W video frames 207 may NOT be deleted but rather may be retained in the memory 118 because they contain video frame information that has not been cropped and hence is valid for all of the lanes 106, 108, 110.

At block 252, if all of the lanes 106, 108, 110 have not been processed by the traffic analytics engine 122, the processing may return to block 204. In a preferred embodiment, the processing returns instead to block 208 (thus, the processing of video frames 203 to convert them to B&W video frames 207 does not need to be repeated). At block 208, a LDR mask associated with the next one of lanes 106, 108, 110 to be processed is used to generate cropped frames 209 associated with this next lane and the processing of method 200 proceeds as described above, this time processing for a different lane detection region.

At block 252, if all of the lanes 106, 108, 110 have been processed for this block of video frames 203, the processing proceeds to block 256. At block 256, if the lane counts 249 have not yet been stored off to the data store 126 (e.g., stored off to data store 126 upon proceeding to process block 252), they are now stored in the data store 126 along with their associated timestamps. At block 258 the processing returns to block 204 and the method 200 processes the next block of video frames 203, for example begins processing the next two minutes of video frames 203.

It will be appreciated that a number of modifications of the method 200 may be made without departing from the spirit of the present disclosure. For example, various simplifications may be made to reduce the processing burden of the method 200 without greatly increasing the inaccuracy of lane counts 249. For example, in an embodiment, the process of generating the background reference frame 233 may be simplified by directly averaging at block 232 all the cropped frames 209 generated at block 208, skipping the processing of blocks 212 through 230.

For example, in an embodiment, the background reference frame 233 may not be determined for each different block of video frames 203 but a background reference frame 233 may be determined once and reused to process a plurality of successive different blocks of video frames 203. For example, the background reference frame 233 may be determined once every five blocks of video frames 203, once every ten blocks of video frames 203, once every fifteen blocks of video frames 203, once every twenty blocks of video frames 203, once every twenty-five blocks of video frames 203, once every thirty blocks of video frames, or at least once every sixty blocks of video frames 203. This means that when the background reference frame 203 is reused, the processing of blocks 212 through 232 can be skipped, thereby reducing the processing load presented by the traffic analytics engine 122.

In an embodiment, the processing of the method 200 may skip processing every other video frame 203. This would effectively change a frame rate of the video from 30 frames per second to 15 frames per second or from 24 frames per second to 12 frames per second. In an embodiment, the processing of the method 200 may skip two video frames 203 and process every third video frame 203. This would effectively change a frame rate of the video from 30 frames per second to 10 frames per second or from 24 frames per second to 8 frames per second. Under some circumstances, this alternative embodiment can reduce the processing burden of method 200 while still not sacrificing too much vehicle detection and lane counting accuracy. In an embodiment, the method 200 may skip three out of every four frames and process only the fourth frame. In an embodiment, the method 200 may skip four out of every five frames and process only the fifth frame. In an embodiment, the method 200 may skip five out of every six frames and process only the sixth frame. In an embodiment, the method 200 may skip six out of every seven frames and process only the seventh frame. In an embodiment, the method 200 may skip seven out of every eight frames and process only the eighth frame. In an embodiment, the method 200 may skip eight out of every nine frames and process only the ninth frame. In an embodiment, the method 200 may skip nine out of every ten frames and process only the tenth frame. In an embodiment, the method 200 may skip ten or more frames in succession but skip less than thirty frames in succession.

For example, in an embodiment, the LDRs may be defined not as trapezoids but as rectangles, the LDR masks may be dispensed with, and the cropped frames 209 may be constructed to only contain the pixels of the B&W frames that fall within the defined LDR rectangles. For example, the 1080×1920 pixel array of the video frame 203 may be reduced to a maximum rectangle that could be contained within the trapezoidal LDR described above that is about 154×160 pixels. The rest of the processing could be performed simply on this much reduced set of pixels (80 times fewer pixels), disregarding processing of '0' value pixels in the cropped frames 209 described above which still each contain 1080×1920 pixels (the vast majority of which pixels are forced to '0' values by the LDR masks).

Enhancements to the system 100 described above with reference to FIG. 1 could rely upon two video cameras 102 rather than a single video camera 102. When a vehicle in a first lane occludes the view of a different vehicle in a second lane, this could be identified by comparing the different video frames of the same timestamp produced by the two video cameras 102 and adjustments in processing could be made accordingly. In an embodiment, enhancements to the system 100 could involve the traffic analytics engine 122 defining two LDR masks per lane 106, 108, 110, processing each lane separately for each of the two LDR masks associated with the same lane, and using time-shifted indications of vehicle presence to derive a speed of traffic in that lane from the analysis. In an embodiment, enhancements to the traffic analysis engine 122 may involve the traffic analytics engine 122 defining two or more LDR masks per lane 106, 108, 110, processing each lane separately for each of the two or more LDR masks associated with the same lane to develop lane counts for each different LDR mask for the lane, and averaging the lane counts developed by the traffic analysis engine 122 independently for each of the two or more LDR masks to obtain a more accurate lane count for the subject lane. In an embodiment, enhancements to the traffic analysis engine 122 could involve the traffic analysis engine 122 using image processing filtering techniques to accentuate vehicle features to improve the count accuracy. These image processing filtering techniques may include, but are not limited to, high pass filters, edge enhancement filters, and/or contrast enhancement filters. In an embodiment, use of these image processing filtering techniques may increase the pixel intensity variances ($\sigma_2^2$) 239 of frames where vehicles are present, and thereby improve the count accuracy.

The method 200 is basically statistical in its approach and as such can rely upon highly efficient standardized mathematical operations selected from libraries of software functions. The statistical signature used to detect and count a vehicle passing a point in one of the lanes 106, 108, 110 is a statistical variance above a threshold of pixel intensities in a lane detection region from a statistically determined norm of pixel intensities in the lane detection region. This difference of pixel intensities can be readily discerned by human vision to detect the presence of a vehicle; it is the application of computational analytics provided by the traffic analytics engine 122/132 to analyze frame-to-frame differences of pixel intensities to detect the presence of a vehicle that may be referred to as machine vision in some contexts herein. The method 200 can be implemented in a very efficient manner and has been demonstrated to produce lane counts of traffic that are accurate to within 95% of actual lane counts (e.g., lane counts performed by human beings observing the video frames 203). Many prior art systems of traffic detection and/or counting rely on overcomplicated methods that are overkill for the limited task of counting traffic and create an excessive processing burden on computing systems, thereby entailing excessive processing costs. Additionally, most prior art systems of traffic detection and/or counting do not approach the 95% count accuracy of the disclosed traffic detection system.

In an embodiment, the system 100 may comprise two video cameras 102, where each difference video camera 102 is directed to a different plurality of lanes of a roadway 104. For example, the roadway 104 may comprise 8 lanes, the first video camera 102 may be directed to lanes 1-4 of the roadway 104, and the second video camera 102 may be directed to lanes 5-8 of the roadway 104. The first video camera 102 may generate a first block of video frames corresponding to a particular time interval, and the second video camera 102 may generate a second block of video frames corresponding to the same particular time interval. A single computer system 114 and a single traffic analytics engine 122 may process these two blocks of video frames to generate a set of vehicle detections and lane counts for each of the eight lanes of the roadway 104.

Alternatively, a separate computer system 114 and traffic analytics engine 122 may be dedicated to processing each separate block of video frames. For example, a first computer system 114 executing a first instance of the traffic analytics engine 122 may develop vehicle detections and lane counts for lanes 1-4 of the highway 104, and a second computer system 114 executing a second instance of the traffic analytics engine 122 may develop vehicle detections and lane counts for lanes 5-8 of the highway 104. This alternative approach might be favored when the traffic analytics engine 122 is embedded in the video camera 102 itself, a possible embodiment noted above. Either of these two approaches to partitioning across a plurality of video cameras 102 may be implemented for a larger number of video cameras 102, for example for three video cameras 102, four video cameras 102, five video cameras 102, or some larger number of video cameras less than thirty video cameras 102.

Figure 3A:
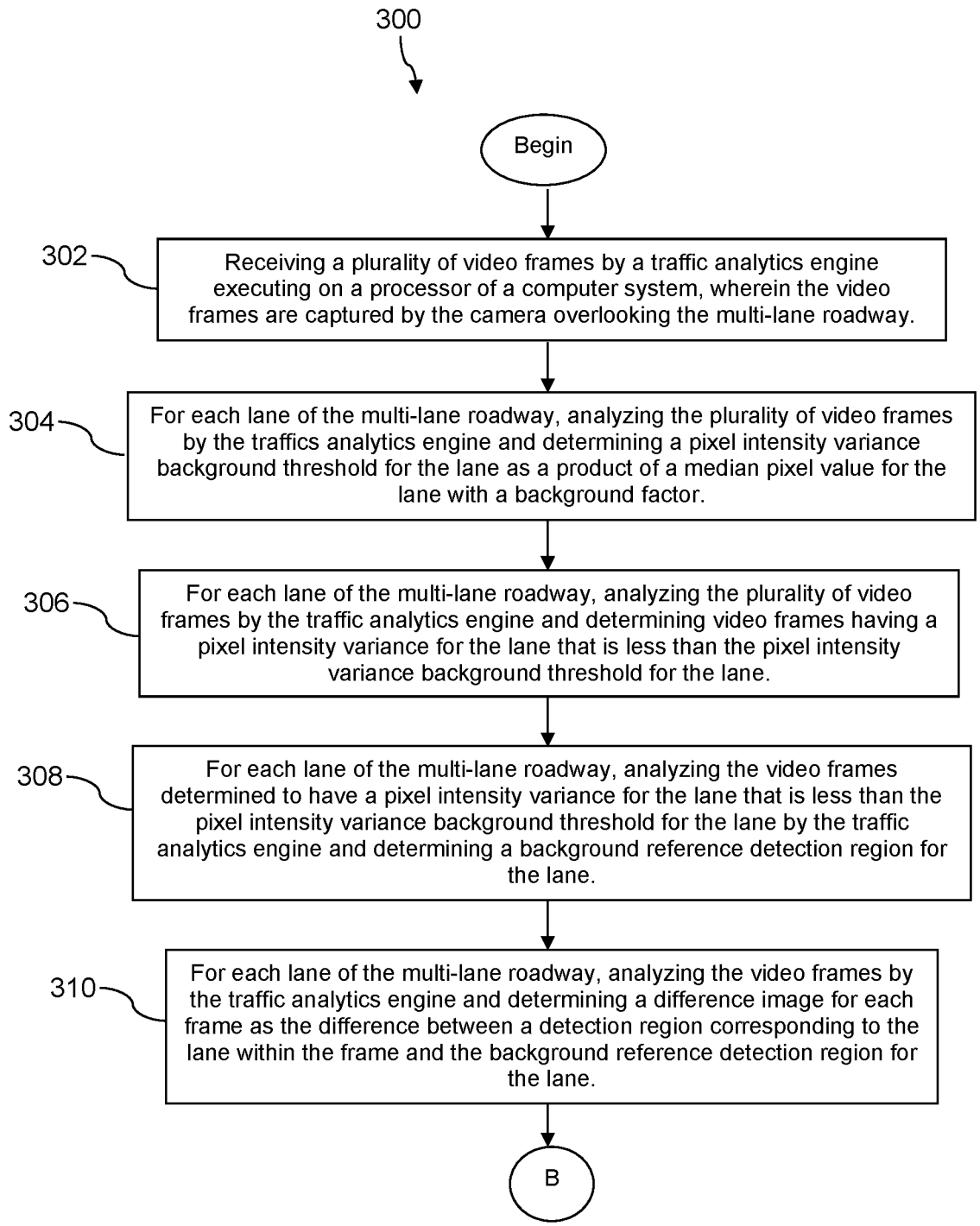
FIG. 3A and FIG. 3B is a flow chart of another method according to an embodiment of the disclosure.
Figure 3B:
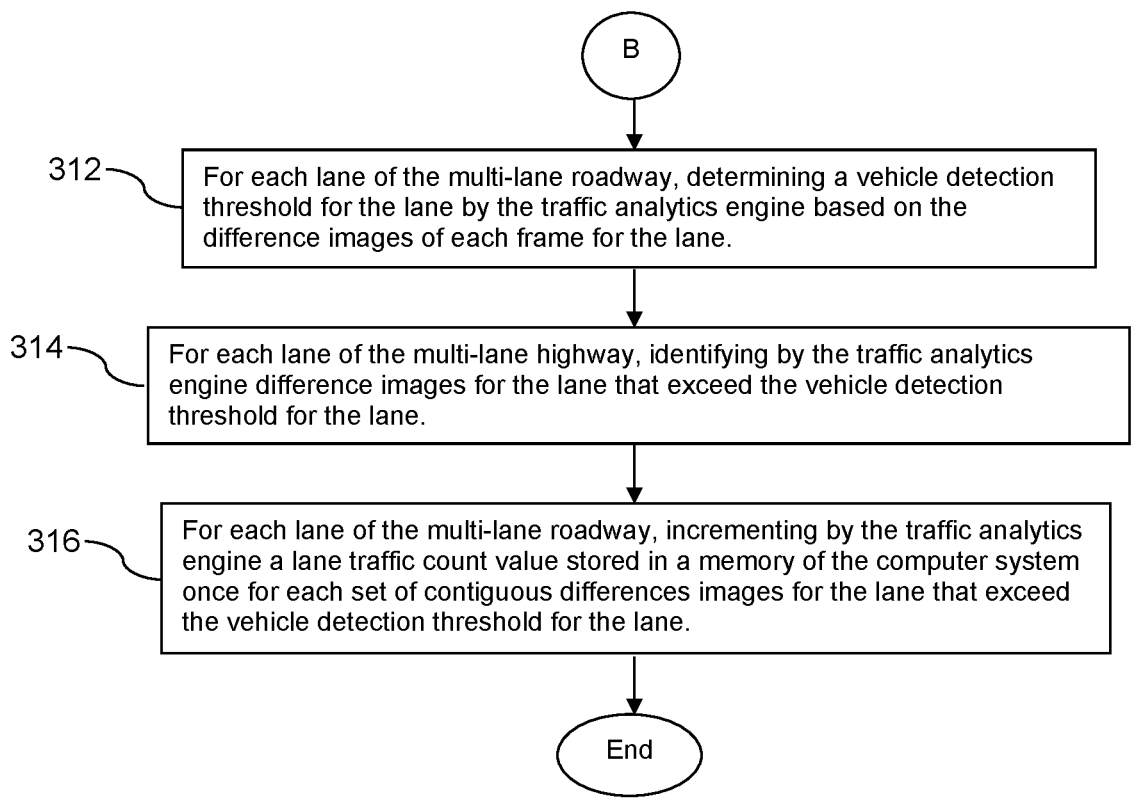

Turning now to FIG. 3A and FIG. 3B, a method 300 is described. In an embodiment, the method 300 is a method of counting traffic passing a camera overlooking a multi-lane roadway. In an embodiment, much or all of the processing of the method 300 is performed by the traffic analytics engine 122 or by the traffic analytics engine 132 described above with reference to FIG. 1. At block 302, the method 300 comprises receiving a plurality of video frames by a traffic analytics engine executing on a processor of a computer system, wherein the video frames are captured by the camera overlooking the multi-lane roadway. In an embodiment, the camera is a video camera. In an embodiment, the camera is an infrared camera or an infrared video camera.

At block 304, the method 300 comprises, for each lane of the multi-lane roadway, analyzing the plurality of video frames by the traffic analytics engine and determining a pixel intensity variance background threshold for the lane as a product of a median pixel intensity value for the lane with a background factor that is less than 1.0. At block 306, the method 300 comprises, for each lane of the multi-lane roadway, analyzing the plurality of video frames by the traffic analytics engine and determining video frames having a pixel intensity variance for the lane that is less than the pixel intensity variance background threshold for the lane.

At block 308, the method 300 comprises, for each lane of the multi-lane roadway, analyzing the video frames determined to have a pixel intensity variance for the lane that is less than the pixel intensity variance background threshold for the lane by the traffic analytics engine and determining a background reference frame for the lane. In an embodiment, determining the background reference frame for each lane comprises averaging corresponding pixel intensity values of each of the video frames determined to have a pixel intensity variance value for the lane that is less than the pixel intensity variance background threshold for the lane. At block 310, the method 300 comprises, for each lane of the multi-lane roadway, analyzing the video frames by the traffic analytics engine and determining a difference image for each frame as the difference between a lane detection region corresponding to the lane within the frame and the background reference frame for the lane.

At block 312, the method 300 comprises, for each lane of the multi-lane roadway, determining a vehicle detection threshold for the lane by the traffic analytics engine based on the difference images of each frame for the lane. At block 314, the method 300 comprises, for each lane of the multi-lane roadway, identifying by the traffic analytics engine difference images for the lane that exceed the vehicle detection threshold for the lane.

At block 316, the method 300 comprises, for each lane of the multi-lane roadway, incrementing by the traffic analytics engine a lane traffic count value stored in a memory of the computer system once for each set of contiguous differences images for the lane that exceed the vehicle detection threshold for the lane.

In an embodiment, the method 300 comprises determining a lane detection region (LDR) mask for each lane by the traffic analytics engine based on analyzing some video frames captured by the camera overlooking the roadway and based on an assumed average length of a vehicle; and, for each lane, processing the plurality of video frames by the traffic analytics engine with the LDR mask to produce a corresponding plurality of cropped frames wherein pixel intensity values of the cropped frames outside a lane detection region are '0' values. In this case, analyzing the plurality of video frames by the traffic analytics engine (e.g., the analyzing at block 304, block 306, block 308, block 310), for each lane, comprises analyzing the cropped frames. In an embodiment (e.g., when the improved cropped frame that creates a sub-image of the initially cropped frame described above with reference to FIG. 2A, FIG. 2B, FIG. 2C, and FIG. 2D), the cropped frame comprises a number of pixel intensity values that is less than twenty percent of the number of pixel intensity values in the video frames received by the traffic analytics engine.

In an embodiment, the method 300 comprises for each lane, determining a pixel intensity variance for each difference image associated with the lane by the traffic analytics engine as the average of the sum of the squares of pixel intensity values of the difference image; for each lane, determining a median pixel intensity variance by the traffic analytics engine from the pixel intensity variances determined from each of the difference images associated with the lane; for each lane, determining the vehicle detection threshold for the lane by the traffic analytics engine by multiplying the median pixel intensity variance for the lane by a factor in the range of 2 to 50; wherein identifying difference images for the lane that exceed the vehicle detection threshold for the lane comprises identifying pixel intensity variances associated with difference images that exceed the vehicle detection threshold. In an embodiment, the factor is between 3 and 40. In embodiment, the factor is between 4 and 30. In an embodiment, the factor is between 5 and 25. In an embodiment, the factor is between 10 and 20.

Figure 4:
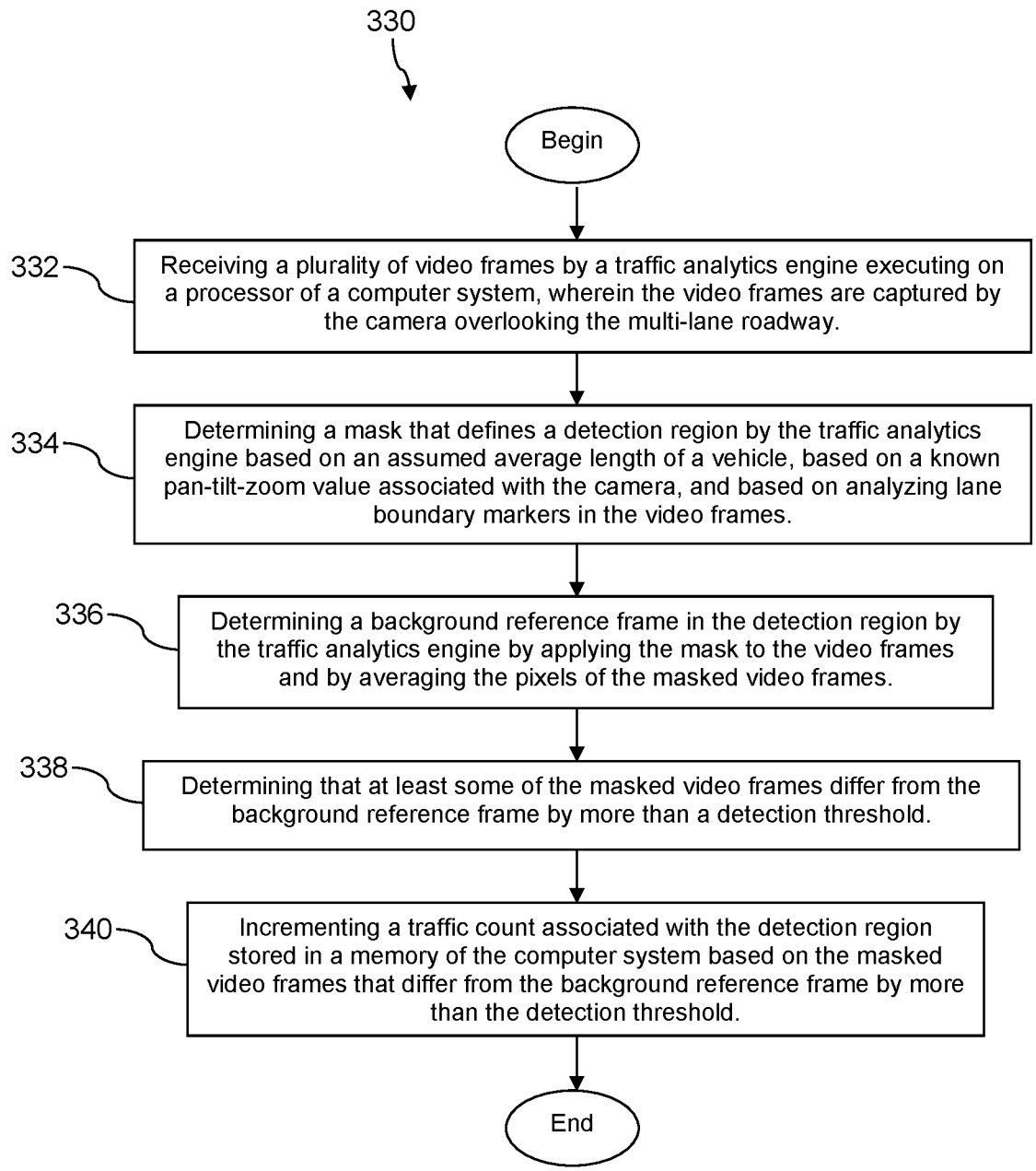
FIG. 4 is a flow chart of yet another method according to an embodiment of the disclosure.

Turning now to FIG. 4, a method 330 is described. In an embodiment, the method 300 is a method of counting traffic passing a camera overlooking a roadway. In an embodiment, the camera is a video camera. In an embodiment, the camera is an infrared camera or an infrared video camera. In an embodiment, much or all of the processing of the method 330 is performed by the traffic analytics engine 122 described above with reference to FIG. 1. At block 332, the method 330 comprises receiving a plurality of video frames by a traffic analytics engine executing on a processor of a computer system, wherein the video frames are captured by the camera overlooking the multi-lane roadway. In an embodiment, the traffic analytics engine executes on one or more virtual server in a cloud computing environment.

At block 334, the method 330 comprises determining a mask that defines a lane detection region by the traffic analytics engine based on an assumed average length of a vehicle, based on a known pan-tilt-zoom value associated with the camera, and based on analyzing lane boundary markers in the video frames. In an embodiment, the definition of the lane detection region by the traffic analytics engine is also based on a known elevation of the camera above the roadway 104. In an embodiment, the lane detection region defines a trapezoidal detection region. At block 336, the method 330 comprises determining a background reference frame in the lane detection region by the traffic analytics engine by applying the mask to the video frames and by averaging the pixels of the masked video frames. The masked video frames are video frames generated by processing the video frames received from the video cameras with the mask (e.g., the LDR mask described above with reference to FIG. 2A, FIG. 2B, FIG. 2C, and FIG. 2D).

At block 338, the method 330 comprises determining that at least some of the masked video frames differ from the background reference frame by more than a detection threshold. At block 340, the method 330 comprises incrementing a traffic count associated with the lane detection region stored in a memory of the computer system based on the masked video frames that differ from the background reference frame by more than the detection threshold. In an embodiment, the method 330 comprises converting video frames from a color frame to a black and white frame by the traffic analytics engine before analyzing. In an embodiment, the video frames are color frames, and the traffic analytics engine analyzes the video frames as color frames.

Figure 5:
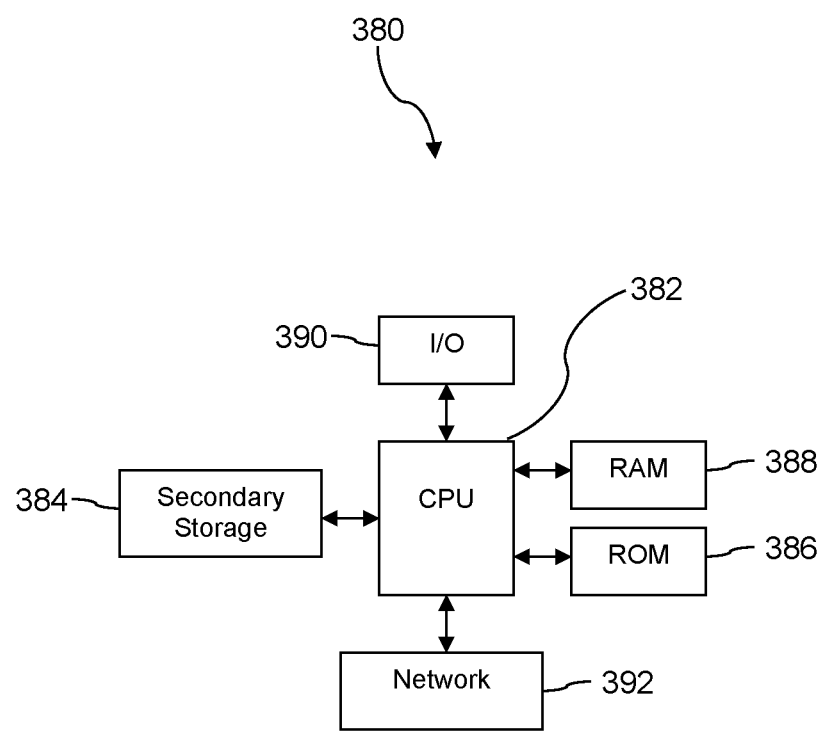
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 4G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Additional Embodiments

The following are non-limiting, specific embodiments in accordance with the present disclosure:

A first embodiment, which is a traffic detection system comprising at least one processor; a memory; and a traffic analytics engine stored in the memory that, when executed by the at least one processor receives a plurality of video frames captured by a camera overlooking a roadway, analyzes the plurality of video frames and determines a pixel intensity variance background threshold as a product of a median pixel intensity value with a background factor that is less than 1.0, analyzes the plurality of video frames and determines video frames having a pixel intensity variance that is less than the pixel intensity variance background threshold, analyzes the video frames determined to have a pixel intensity variance that is less than the pixel intensity variance background threshold and determines a background reference frame, analyzes the video frames and determines a difference image for each video frame as the difference between a lane detection region of the roadway within the video frame and the background reference frame, determines a vehicle detection threshold based on the difference images of each video frame, identifies difference images that exceed the vehicle detection threshold, increments a roadway traffic count value stored in the memory once for each set of contiguous differences images that exceed the vehicle detection threshold.

A second embodiment, which is the traffic detection system of the first embodiment, wherein the traffic analytics engine further determines a detection region (DR) mask based on analyzing some video frames received from the camera overlooking the roadway and based on an assumed average length of a vehicle; wherein the traffic analytics engine further processes the plurality of video frames with the DR mask to produce a corresponding plurality of cropped frames wherein pixel intensity values of the cropped frames outside a detection region are '0' values; and wherein the traffic analytics engine analyzing video frames comprises analyzing the cropped frames.

A third embodiment, which is the traffic detection system of the second embodiment, wherein the cropped frame comprises a number of pixel intensity values that is less than twenty percent of the number of pixel intensity values in the video frames received by the traffic analytics engine.

A fourth embodiment, which is the traffic detection system of any of the first through the third embodiment, wherein traffic analytics engine determines the background reference frame by averaging corresponding pixel intensity values of each of the video frames determined to have a pixel intensity value that is less than the pixel intensity variance background threshold.

A fifth embodiment, which is the traffic detection system of any of the first through the fourth embodiment, wherein the traffic analytics engine, determines a pixel intensity variance for each difference image as the average of the sum of the squares of pixel intensity values of the difference image; wherein the traffic analytics engine determines a median pixel intensity variance from the pixel intensity variances determined from each of the difference images; wherein the traffic analytics engine determines the vehicle detection threshold by multiplying the median pixel intensity variance by a factor in the range of 2 to 50; and wherein the traffic analytics engine identifies difference images for that exceed the vehicle detection threshold by identifying pixel intensity variances associated with difference images that exceed the vehicle detection threshold.

A sixth embodiment, which is the traffic detection system of any of the first through the fifth embodiment, wherein the traffic analytics engine determines a pixel intensity variance for each difference image associated as the average of the sum of the squares of pixel intensity values of the difference image; wherein the traffic analytics engine determines a median pixel intensity variance from the pixel intensity variances determined from each of the difference images associated; wherein the traffic analytics engine determines the vehicle detection threshold by multiplying the median pixel intensity variance by a factor in the range of 2 to 50; wherein the traffic analytics engine determines a windowed average pixel intensity value for each difference image as the average of the sum of the pixel intensity value for the difference image and the pixel intensity values of a plurality of pixel intensity values for a plurality of adjacent difference images; and wherein the traffic analytics engine identifies difference images that exceed the vehicle detection threshold by identifying the windowed average pixel intensity values associated with the difference images that exceed the vehicle detection threshold.

A seventh embodiment, which is the traffic detection system of any of the first through the sixth embodiment, wherein the traffic analytics engine converts the video frames from color frames to black and white frames before analyzing the video frames.

An eight embodiment, which is the traffic detection system of any of the first through the seventh embodiment, wherein the camera overlooking the multi-lane roadway is a video camera.

A ninth embodiment, which is the traffic detection system of any of the first through the eighth embodiment, wherein the video camera is a color video camera.

A tenth embodiment, which is the traffic detection system of any of the first through the eighth embodiment, wherein the video camera is a black and white video camera.

An eleventh embodiment, which is the traffic detection system of any of the first through the eighth embodiment, wherein the video camera is a color video camera.

A twelfth embodiment, which is the traffic detection system of any of the first through the eleventh embodiment, wherein the video camera is an infrared video camera.

A thirteenth embodiment, which is the traffic detection system of any of the first through the twelfth embodiment, wherein the traffic analytics engine thins out pixel intensity values of the video frames before analyzing the video frames.

A fourteenth embodiment, which is the traffic detection system of the thirteenth embodiment, wherein the traffic analytics engine thins out the pixel intensity values of the video frames by deleting pixel intensity values from the video frames to reduce the total number of pixel values of the video frames.

A fifteenth embodiment, which is the traffic detection system of the fourteenth embodiment, wherein the traffic analytics engine thins out the pixel intensity values of the video frames by deleting every other pixel intensity value from the video frames.

A sixteenth embodiment, which is the traffic detection system of the fourteenth embodiment, wherein the traffic analytics engine thins out the pixel intensity values of the video frames by deleting two of every three pixel intensity values from the video frames.

A seventeenth embodiment, which is the traffic detection system of any of the first through the sixteenth embodiment, wherein the traffic analytics engine skips processing every other video frame.

An eighteenth embodiment, which is the traffic detection system of any of the first through the sixteenth embodiment, wherein the traffic analytics engine skips processing two of every three video frames.

A nineteenth embodiment, which is a traffic detection system comprising at least one processor; a memory; and a traffic analytics engine stored in the memory that, when executed by the at least one processor receives a plurality of video frames captured by a camera overlooking a multi-lane roadway, for each lane of the multi-lane roadway, analyzes the plurality of video frames and determines a pixel intensity variance background threshold for the lane as a product of a median pixel intensity value for the lane with a background factor that is less than 1.0, for each lane of the multi-lane roadway, analyzes the plurality of video frames and determines video frames having a pixel intensity variance for the lane that is less than the pixel intensity variance background threshold for the lane, for each lane of the multi-lane roadway, analyzes the video frames determined to have a pixel intensity variance for the lane that is less than the pixel intensity variance background threshold for the lane and determines a background reference frame for the lane, for each lane of the multi-lane roadway, analyzes the video frames and determines a difference image for each video frame as the difference between a lane detection region corresponding to the lane within the video frame and the background reference frame for the lane, for each lane of the multi-lane roadway, determines a vehicle detection threshold for the lane based on the difference images of each video frame for the lane, for each lane of the multi-lane roadway, identifies difference images for the lane that exceed the vehicle detection threshold for the lane, for each lane of the multi-lane roadway, increments a lane traffic count value stored in the memory once for each set of contiguous differences images for the lane that exceed the vehicle detection threshold for the lane.

A twentieth embodiment, which is the traffic detection system of the nineteenth embodiment, wherein the traffic analytics engine further determines a lane detection region (LDR) mask for each lane based on analyzing some video frames received from the camera overlooking the roadway and based on an assumed average length of a vehicle; wherein the traffic analytics engine further processes the plurality of video frames, for each lane, with the LDR mask to produce a corresponding plurality of cropped frames wherein pixel intensity values of the cropped frames outside a lane detection region are '0' values; and wherein the traffic analytics engine analyzing video frames, for each lane, comprises analyzing the cropped frames.

A twenty-first embodiment, which is the traffic detection system of the twentieth embodiment, wherein the cropped frame comprises a number of pixel intensity values that is less than twenty percent of the number of pixel intensity values in the video frames received by the traffic analytics engine.

A twenty-second embodiment, which is the traffic detection system of any of the nineteenth through the twenty-first embodiment, wherein traffic analytics engine determines the background reference frame for each lane by averaging corresponding pixel intensity values of each of the video frames determined to have a pixel intensity value for the lane that is less than the pixel intensity variance background threshold for the lane.

A twenty-third embodiment, which is the traffic detection system of any of the nineteenth through the twenty-second embodiment, wherein the traffic analytics engine, for each lane, determines a mean pixel intensity value for each difference image associated with the lane; wherein the traffic analytics engine, for each lane, determines a pixel intensity variance for each difference image associated with the lane as the average of the squares of the differences found by subtracting the mean pixel intensity value determined for the difference image from each pixel intensity value of the difference image; wherein the traffic analytics engine, for each lane, determines a median pixel intensity variance from the pixel intensity variances determined from each of the difference images associated with the lane; wherein the traffic analytics engine, for each lane, determines the vehicle detection threshold for the lane by multiplying the median pixel intensity variance for the lane by a factor in the range of 2 to 50; and wherein the traffic analytics engine, for each lane, identifies difference images for the lane that exceed the vehicle detection threshold for the lane by identifying pixel intensity variances associated with difference images that exceed the vehicle detection threshold.

A twenty-fourth embodiment, which is the traffic detection system of any of the nineteenth through the twenty-third embodiment, wherein the traffic analytics engine, for each lane, determines a mean pixel intensity value for each difference image associated with the lane; wherein the traffic analytics engine, for each lane, determines a pixel intensity variance for each difference image associated with the lane as the average of the squares of the differences found by subtracting the mean pixel intensity value determined for the difference image from each pixel intensity value of the difference image; wherein the traffic analytics engine, for each lane, determines a median pixel intensity variance from the pixel intensity variances determined from each of the difference images associated with the lane; wherein the traffic analytics engine, for each lane, determines the vehicle detection threshold for the lane by multiplying the median pixel intensity variance for the lane by a factor in the range of 2 to 50; wherein the traffic analytics engine, for each lane, determines a windowed average pixel intensity value for each difference image for the lane as the average of the sum of the pixel intensity value for the difference image and the pixel intensity values of a plurality of pixel intensity values for a plurality of adjacent difference images for the lane; and wherein the traffic analytics engine, for each lane, identifies difference images for the lane that exceed the vehicle detection threshold for the lane by identifying the windowed average pixel intensity values associated with the difference images that exceed the vehicle detection threshold.

A twenty-fifth embodiment, which is the traffic detection system of any of the nineteenth through the twenty-fourth embodiment, wherein the traffic analytics engine converts the video frames from color frames to black and white frames before analyzing the video frames.

A twenty-sixth embodiment, which is the traffic detection system of any of the nineteenth through the twenty-fifth embodiment, wherein the camera overlooking the multi-lane roadway is a video camera.

A twenty-seventh embodiment, which is the traffic detection system of the twenty-sixth embodiment, wherein the video camera is a color video camera.

A twenty-eighth embodiment, which is the traffic detection system of the twenty-sixth embodiment, wherein the video camera is a black and white video camera.

A twenty-ninth embodiment, which is the traffic detection system of the twenty-sixth embodiment, wherein the video camera is an infrared video camera.

A thirtieth embodiment, which is the traffic detection system of any of the nineteenth through the twenty-ninth embodiment, wherein the traffic analytics engine thins out pixel intensity values of the video frames before analyzing the video frames.

A thirty-first embodiment, which is the traffic detection system of the thirtieth embodiment, wherein the traffic analytics engine thins out the pixel intensity values of the video frames by deleting pixel intensity values from the video frames to reduce the total number of pixel values of the video frames.

A thirty-second embodiment, which is the traffic detection system of the thirty-first embodiment, wherein the traffic analytics engine thins out the pixel intensity values of the video frames by deleting every other pixel intensity value from the video frames.

A thirty-third embodiment, which is the traffic detection system of the thirty-first embodiment, wherein the traffic analytics engine thins out the pixel intensity values of the video frames by deleting two of every three pixel intensity values from the video frames.

A thirty-fourth embodiment, which is the traffic detection system of any of the nineteenth through the thirty-third embodiment, wherein the traffic analytics engine skips processing every other video frame.

A thirty-fifth embodiment, which is the traffic detection system of any of the nineteenth through the thirty-third embodiment, wherein the traffic analytics engine skips processing two of every three video frames.

A thirty-sixth embodiment, which is a method of detecting traffic passing a camera overlooking a multi-lane roadway comprising receiving a plurality of video frames by a traffic analytics engine executing on a processor of a computer system, wherein the video frames are captured by the camera overlooking the multi-lane roadway; for each lane of the multi-lane roadway, analyzing the plurality of video frames by the traffic analytics engine and determining a pixel intensity variance background threshold for the lane as a product of a median pixel intensity value for the lane with a background factor that is less than 1.0; for each lane of the multi-lane roadway, analyzing the plurality of video frames by the traffic analytics engine and determining video frames having a pixel intensity variance for the lane that is less than the pixel intensity variance background threshold for the lane; for each lane of the multi-lane roadway, analyzing the video frames determined to have a pixel intensity variance for the lane that is less than the pixel intensity variance background threshold for the lane by the traffic analytics engine and determining a background reference frame for the lane; for each lane of the multi-lane roadway, analyzing the video frames by the traffic analytics engine and determining a difference image for each frame as the difference between a lane detection region corresponding to the lane within the frame and the background reference frame for the lane; for each lane of the multi-lane roadway, determining a vehicle detection threshold for the lane by the traffic analytics engine based on the difference images of each frame for the lane; for each lane of the multi-lane roadway, identifying by the traffic analytics engine difference images for the lane that exceed the vehicle detection threshold for the lane; and for each lane of the multi-lane roadway, incrementing by the traffic analytics engine a lane traffic count value stored in a memory of the computer system once for each set of contiguous differences images for the lane that exceed the vehicle detection threshold for the lane.

A thirty-seventh embodiment, which is the method of the thirty-sixth embodiment further comprising determining a lane detection region (LDR) mask for each lane by the traffic analytics engine based on analyzing some video frames captured by the camera overlooking the roadway and based on an assumed average length of a vehicle; for each lane, processing the plurality of video frames by the traffic analytics engine with the LDR mask to produce a corresponding plurality of cropped frames wherein pixel intensity values of the cropped frames outside a lane detection region are '0' values, wherein analyzing the plurality of video frames by the traffic analytics engine, for each lane, comprises analyzing the cropped frames.

A thirty-eighth embodiment, which is the method of the thirty-seventh embodiment, wherein the cropped frame comprises a number of pixel intensity values that is less than twenty percent of the number of pixel intensity values in the video frames received by the traffic analytics engine.

A thirty-ninth embodiment, which is the method of any of the thirty-sixth through the thirty-eighth embodiment, wherein determining the background reference frame for each lane comprises averaging corresponding pixel intensity values of each of the video frames determined to have a pixel intensity value for the lane that is less than the pixel intensity variance background threshold for the lane.

A fortieth embodiment, which is the method of any of the thirty-sixth through the thirty-ninth embodiment, further comprising, for each lane, determining a mean pixel intensity value for each difference image associated with the lane by the traffic analytics engine; for each lane, determining a pixel intensity variance for each difference image associated with the lane by the traffic analytics engine as the average of the squares of the differences found by subtracting the mean pixel intensity value determined for the difference image from each pixel intensity value of the difference image; for each lane, determining a median pixel intensity variance by the traffic analytics engine from the pixel intensity variances determined from each of the difference images associated with the lane; for each lane, determining the vehicle detection threshold for the lane by the traffic analytics engine by multiplying the median pixel intensity variance for the lane by a factor in the range of 2 to 50; wherein identifying difference images for the lane that exceed the vehicle detection threshold for the lane comprises identifying pixel intensity variances associated with difference images that exceed the vehicle detection threshold.

A forty-first embodiment, which is the method of any of the thirty-sixth through the fortieth embodiment, further comprising converting the video frames from color frames to black and white frames before analyzing the video frames.

A forty-second embodiment, which is the method of any of the thirty-sixth through the forty-second embodiment, further comprising thinning out pixel intensity values of the video frames by the traffic analytics engine before analyzing the video frames.

A forty-third embodiment, which is a method of detecting traffic passing a camera overlooking a roadway comprising receiving a plurality of video frames by a traffic analytics engine executing on a processor of a computer system, wherein the video frames are captured by the camera overlooking the multi-lane roadway; determining a mask that defines a lane detection region by the traffic analytics engine based on an assumed average length of a vehicle, based on a known pan-tilt-zoom value associated with the camera, and based on analyzing lane boundary markers in the video frames; determining a background reference frame in the lane detection region by the traffic analytics engine by applying the mask to the video frames and by averaging the pixels of the masked video frames; determining that at least some of the masked video frames differ from the background reference frame by more than a detection threshold; and incrementing a traffic count associated with the lane detection region stored in a memory of the computer system based on the masked video frames that differ from the background reference frame by more than the detection threshold.

A forty-fourth embodiment, which is the method of the forty-third embodiment, further comprising converting each of the plurality of video frames from a color frame to a black and white frame.

A forty-fifth embodiment, which is the method of the forty-third embodiment, wherein the video frames are color frames and the traffic analytics engine analyzes the video frames as color frames.

A forty-sixth embodiment, which is the method of the forty-third embodiment, wherein the camera overlooking the multi-lane roadway is an infrared camera.

A forty-seventh embodiment, which is the method of any of the forty-third through the forty-sixth embodiment, wherein the lane detection region defines a trapezoidal detection region.

A forty-eighth embodiment, which is the method of any of the forty-third through the forty-sixth embodiment, wherein the traffic analytics engine executes on a virtual server in a cloud computing environment.

A forty-ninth embodiment, which is the method of any of the forty-third through the forty-eighth embodiment, wherein the traffic analytics engine defined the lane detection region further based on a known elevation of the camera above the roadway.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A traffic detection system, comprising:
   at least one processor;
   a memory; and
   a traffic analytics engine stored in the memory that, when executed by the at least one processor:
      receives a plurality of video frames captured by a camera overlooking a multi-lane roadway,
      for each lane of the multi-lane roadway:
         generates cropped video frames based on video frames of the plurality of video frames associated with the lane,
         analyzes the cropped video frames and determines a pixel intensity variance background threshold for the lane as a product of a median pixel intensity variance value for the lane with a background factor that is less than 1.0,
         analyzes the cropped video frames and determines background video frames, wherein each of the background video frames has having a pixel intensity variance for the lane that is less than the pixel intensity variance background threshold for the lane,
         analyzes the background video frames and determines a cropped background reference frame for the lane,
         analyzes the cropped video frames and determines a difference image corresponding to each cropped video frame as a pixel-by-pixel difference between the each cropped video frame and the cropped background reference frame for the lane,
         determines a vehicle detection threshold for the lane based on the difference images of the cropped video frames for the lane,
         identifies difference images for the lane that have pixel intensity variances that exceed the vehicle detection threshold for the lane, and
         increments a lane traffic count value stored in the memory once for each set of contiguous difference images for the lane that have pixel intensity variances that exceed the vehicle detection threshold for the lane.

2. The traffic detection system of claim 1, wherein the traffic analytics engine further determines a lane detection region (LDR) mask for each lane based on analyzing some video frames received from the camera overlooking the roadway and based on an assumed average length of a vehicle; wherein the traffic analytics engine further processes the plurality of video frames, for each lane, with the LDR mask to produce the cropped video frames, wherein pixel intensity values of pixels of the cropped frames disposed outside the lane detection region mask are '0' values.

3. The traffic detection system of claim 2, wherein each of the cropped video frames comprises a number of pixel intensity values that is less than twenty percent of the number of pixel intensity values in the video frames received by the traffic analytics engine.

4. The traffic detection system of claim 1, wherein traffic analytics engine determines the cropped background reference frame for each lane by averaging corresponding pixel intensity values of each of the background video frames.

5. The traffic detection system of claim 1, wherein the traffic analytics engine, for each lane, determines a mean pixel intensity value for each difference image associated with the lane; wherein the traffic analytics engine, for each lane, determines a pixel intensity variance for each difference image associated with the lane as the average of the squares of the differences found by subtracting the mean pixel intensity value determined for the difference image from each pixel intensity value of the difference image; wherein the traffic analytics engine, for each lane, determines a median pixel intensity variance from the pixel intensity variances determined from each of the difference images associated with the lane; wherein the traffic analytics engine, for each lane, determines the vehicle detection threshold for the lane by multiplying the median pixel intensity variance for the lane by a factor in the range of 2 to 50.

6. The traffic detection system of claim 1, wherein the traffic analytics engine, for each lane, determines a mean pixel intensity value for each difference image associated with the lane; wherein the traffic analytics engine, for each lane, determines a pixel intensity variance for each difference image associated with the lane as the average of the squares of the differences found by subtracting the mean pixel intensity value determined for the difference image from each pixel intensity value of the difference image; wherein the traffic analytics engine, for each lane, determines a median pixel intensity variance from the pixel intensity variances determined from each of the difference images associated with the lane; wherein the traffic analytics engine, for each lane, determines the vehicle detection threshold for the lane by multiplying the median pixel intensity variance for the lane by a factor in the range of 2 to 50; wherein the traffic analytics engine, for each lane, determines a windowed average pixel intensity value for each difference image for the lane as the average of the sum of the pixel intensity value for the difference image and a plurality of pixel intensity values for adjacent difference images for the lane; and wherein the traffic analytics engine, for each lane, identifies difference images for the lane that have the windowed average pixel intensity variance values that exceed the vehicle detection threshold.

7. The traffic detection system of claim 1, wherein the traffic analytics engine converts the video frames from color frames to black and white frames before generating the cropped video frames.

8. A method of detecting traffic passing a camera overlooking a multi-lane roadway, comprising:
receiving a plurality of video frames by a traffic analytics engine executing on a processor of a computer system, wherein the video frames are captured by the camera overlooking the multi-lane roadway;
for each lane of the multi-lane roadway:
generating cropped video frames by the traffic analytics engine based on video frames of the plurality of video frames associated with the lane;
analyzing the cropped video frames by the traffic analytics engine and determining a pixel intensity variance background threshold for the lane as a product of a median pixel intensity variance value for the lane with a background factor that is less than 1.0;
analyzing the cropped video frames by the traffic analytics engine and determining background video frames, wherein each of the background video frames has a pixel intensity variance for the lane that is less than the pixel intensity variance background threshold for the lane;
analyzing the background video frames and determining a cropped background reference frame for the lane;
analyzing the cropped video frames by the traffic analytics engine and determining a difference image corresponding to each cropped video frame as a pixel-by-pixel difference between the each cropped video frame and the cropped background reference frame for the lane;
determining a vehicle detection threshold for the lane by the traffic analytics engine based on the difference images of the cropped video frames for the lane;
identifying by the traffic analytics engine difference images for the lane that have pixel intensity variances that exceed the vehicle detection threshold for the lane; and
incrementing by the traffic analytics engine a lane traffic count value stored in a memory of the computer system once for each set of contiguous difference images for the lane that have pixel intensity variances that exceed the vehicle detection threshold for the lane.

9. The method of claim 8, further comprising:
determining a lane detection region (LDR) mask for each lane by the traffic analytics engine based on analyzing some video frames captured by the camera overlooking the roadway and based on an assumed average length of a vehicle;
for each lane, processing the plurality of video frames by the traffic analytics engine with the LDR mask to produce the cropped video frames, wherein pixel intensity values of pixels of the cropped video frames disposed outside the lane detection region mask are '0' values,
wherein analyzing the plurality of video frames by the traffic analytics engine, for each lane, comprises analyzing the cropped frames.

10. The method of claim 9, wherein each of the cropped video frames comprises a number of pixel intensity values that is less than twenty percent of the number of pixel intensity values in the video frames received by the traffic analytics engine.

11. The method of claim 8, wherein determining the background reference frame for each lane comprises averaging corresponding pixel intensity values of each of the background video frames.

12. The method of claim 8, further comprising:
for each lane, determining a mean pixel intensity value for each difference image associated with the lane by the traffic analytics engine;
for each lane, determining a pixel intensity variance for each difference image associated with the lane by the traffic analytics engine as the average of the squares of the differences found by subtracting the mean pixel intensity value determined for the difference image from each pixel intensity value of the difference image;

for each lane, determining a median pixel intensity variance by the traffic analytics engine from the pixel intensity variances determined for each of the difference images associated with the lane; and for each lane, determining the vehicle detection threshold for the lane by the traffic analytics engine by multiplying the median pixel intensity variance for the lane by a factor in the range of 2 to 50.

13. The method of claim 8, further comprising converting the video frames from color frames to black and white frames before generating the cropped video frames.

14. The method of claim 8, further comprising thinning out pixel intensity values of the video frames by the traffic analytics engine before analyzing generating the cropped video frames.

15. The traffic detection system of claim 1, wherein the cropped video frames used to determine the background frames are successive cropped video frames.

16. The method of claim 8, wherein the cropped video frames used to determine the background frames are successive cropped video frames.

* * * * *